(12) United States Patent
Maruyama et al.

(10) Patent No.: US 6,477,129 B2
(45) Date of Patent: Nov. 5, 2002

(54) OPTICAL DISC DRIVE

(75) Inventors: Koichi Maruyama, Tokyo (JP); Takeshi Shimano, Saitama-Ken (JP); Shigeru Nakamura, Tokyo (JP); Akira Arimoto, Tokyo (JP); Kazuo Shigematsu, Saitama-ken (JP)

(73) Assignees: Hitachi, Ltd., Tokyo (JP); Asahi Kogaku Kogyo Kabushiki Kaisha, Tokyo (JP)

( * ) Notice: Subject to any disclaimer, the term of this patent is extended or adjusted under 35 U.S.C. 154(b) by 21 days.

(21) Appl. No.: 09/794,913

(22) Filed: Feb. 28, 2001

(65) Prior Publication Data

US 2001/0043549 A1 Nov. 22, 2001

(30) Foreign Application Priority Data

Apr. 13, 2000 (JP) ........................................ 2000-112114

(51) Int. Cl.$^7$ ................................................. G11B 7/00
(52) U.S. Cl. ................. 369/112.23; 369/94; 369/44.37; 369/44.23
(58) Field of Search .......................... 369/44.41, 44.11, 369/44.12, 44.14, 44.23, 44.37, 47.1, 53.1, 93, 94, 112.01, 112.23

(56) References Cited

U.S. PATENT DOCUMENTS

| 6,084,843 A | 7/2000 | Abe et al. |
|---|---|---|
| 6,088,322 A | 7/2000 | Broome et al. |
| 6,118,594 A | 9/2000 | Maruyama |
| 6,191,889 B1 | 2/2001 | Maruyama |
| 6,343,058 B1 * | 1/2002 | Akiyama et al. ......... 369/112.1 |
| 6,370,103 B1 * | 4/2002 | Yamazaki et al. ...... 369/112.08 |

FOREIGN PATENT DOCUMENTS

| JP | 8-281819 | 10/1996 |
|---|---|---|
| JP | 10261240 | 9/1998 |
| JP | 10261241 | 9/1998 |
| JP | 11149657 | 6/1999 |

OTHER PUBLICATIONS

English Language Abstract of JP 10–261241.

* cited by examiner

*Primary Examiner*—Muhammad Edun
(74) *Attorney, Agent, or Firm*—Greenblum & Bernstein, P.L.C.

(57) ABSTRACT

An optical disc drive using either one of a first disc (e.g., DVD) and a second disc (e.g., CD), is provided with a first laser diode that emits a shorter wavelength beam, a second laser diode that emits a longer wavelength beam, an objective lens, and a driving unit that holds and rotates the optical disc. The optical axis of the objective lens is inclined relative to a normal to the optical disc. The first laser diode is located at a first position so that the coma, which is caused when the first laser beam is converged on a data recording surface of the first disc, is minimized, and the second laser diode is located at a second position so that the coma, which is caused when the second laser beam is converged on a data recording surface of the second disc, is minimized.

20 Claims, 19 Drawing Sheets

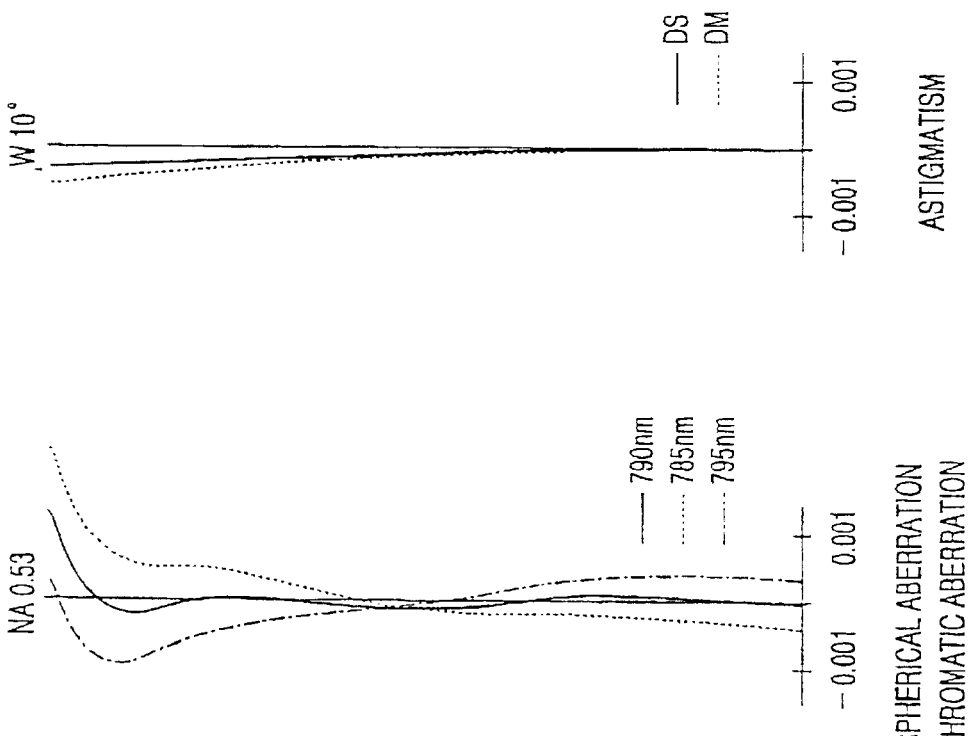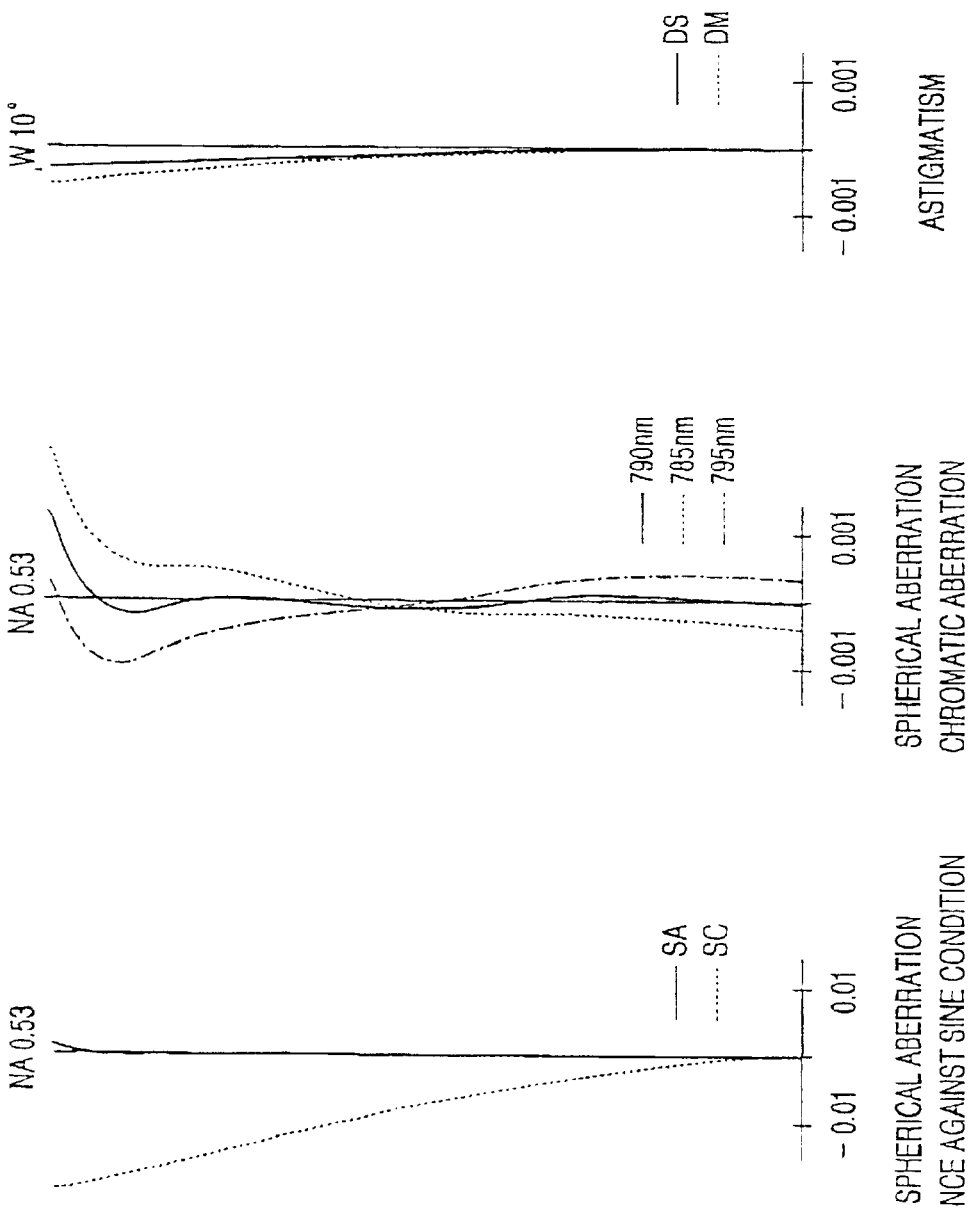

OPTICAL DISC DRIVE

BACKGROUND OF THE INVENTION

The present invention relates to an optical disc drive capable of recording and/or reproducing data to/from various types of optical discs having different characteristics, such as a thickness of a protective layer and a data recording density.

There are a plurality of standards regarding the characteristics of the optical discs, including the thickness of the protective layer which covers a data recording surface of the optical disc and/or the data recording density. For example, the thickness of the protective layer of a CD (Compact Disc) or a CD-R (CD recordable) whose recording density is relatively low is 1.2 mm, while that of a DVD (Digital Versatile Disc) whose recording density is relatively high is 0.60 mm.

For recording and/or reproducing data to/from the DVD, since it has a relatively high data recording density, in order to make the size of a beam spot sufficiently small, a laser beam whose wavelength is in a range of approximately 635–660 nm is to be used. For the CD-R, in view of its reflection characteristics, a laser beam whose wavelength is approximately 780 nm is to be used.

The above-described optical discs may preferably be used in a single optical disc drive. In order to allow a single optical disc drive to use both the DVD and the CD-R, the disc drive is required to have at least two laser sources respectively emitting the laser beams as described above.

In the meantime, in view of downsizing of the disc drive, it is preferable that the optical system adopted in an optical head for the disc drive is as compact as possible. In particular, optical elements such as an objective lens is preferably used for both laser beams, which enables the laser sources (i.e., laser diodes) to be implemented in a single package and provided as a light source module. An example of such an optical disc drive is described in Japanese Patent Provisional Publication No. HEI 10-261240.

If the two laser diodes are incorporated in a single package, beam emitting points of the two laser diodes are aligned in a direction perpendicular to an optical axis of the objective lens. Therefore, at least one of the beam emitting points is located off the optical axis.

According to an embodiment described in the above-described publication, a semiconductor laser chip (wavelength: 660 nm) for a DVD, whose allowable aberration is relatively small, is positioned on an optical axis of a lens system including an objective lens, a collimating lens and the like. The other semiconductor laser chip (wavelength: 780 nm) for the CD is located off the optical axis of the lens system. Therefore, the optical disc drive described in the publication has a disadvantage such that aberration, in particular coma, is relatively large for the CD (or CD-R).

Another example of the optical disc drive is disclosed in Japanese Patent Provisional Publication No. HEI 10-261241. The optical disc drive disclosed in this publication includes the optical system similar to that disclosed in the aforementioned publication (i.e., HEI 10-261240), and further, a holographic optical element (HOE) is added. With this element (HOE), an optical path of the laser beam, whose beam emitting point is located off the optical axis, is deflected (bent) so that the beam is incident on an objective lens in a direction parallel to the optical axis, thereby suppressing the coma.

The HOE disclosed in the latter publication (i.e., HEI 10-261241) utilizes a zero order component of the beam for the DVD and a −1st order diffraction component of the beam for the CD. Therefore, it is difficult to exhibit high diffraction efficiency for both wavelengths, and loss of light is relatively large. Further, since an additional element (i.e., HOE) having a special function as above is added, the manufacturing cost of the optical disc drive increases.

SUMMARY OF THE INVENTION

It is therefore an object of the invention to provide an improved optical disc drive that utilizes a light source module including at least two laser diodes emitting laser beams having different wavelengths, and a single objective optical system for both wavelengths. In this improved optical disc drive, aberration can be well suppressed with allowing recording and reproducing of data to/from a plurality of types of optical discs to be performed, without adding a special optical element such as the HOE.

For the above object, according to the invention, there is provided an optical disc drive capable of recording/reproducing data to/from an optical disc, the optical disc being either one of a first disc and a second disc, a protective layer of the first disc being thinner that that of the second disc, the optical disc drive including a first laser diode that emits a first laser beam having a first wavelength, a second laser diode that emits a second laser beam having a second wavelength, the second wavelength being longer than the first wavelength, an objective lens that converges the first laser beam on the first disc, and the second laser beam on the second disc, and a driving unit that holds and rotates the optical disc. In the optical disc drive constructed as above, an optical axis of the objective lens is inclined relative to a normal to the optical disc, a beam emitting point of the first laser diode is located at a first position, coma, which is caused when the first laser beam is converged on a data recording surface of the first disc, is minimized when the first laser beam is emitted from the first position. Further, a beam emitting point of the second laser diode is located at a second position which is different from the first position, and coma, which is caused when the second laser beam is converged on a data recording surface of the second disc, is minimized when the second laser beam is emitted from the second position.

With this configuration, whichever laser diode emits the laser beam, the coma is well suppressed, without employing an additional optical element such as HOE.

Optionally, the objective lens is configured such that coma is minimized for a hypothetical disc under a hypothetical condition, where the hypothetical disc is defined as an optical disc having a protective layer whose thickness is intermediate between that of the first disc and that of the second disc, and the hypothetical condition is defined as a condition where the optical axis of the objective lens coincides with the normal to the optical disc.

In this case, a first region may be defined on the objective lens, the first region providing a numerical aperture appropriate for converging the second laser beam on the second disc, and the objective lens preferably satisfies the following condition under the hypothetical condition where the optical axis of the objective lens coincides with the normal to the optical disc:

$$-4.0 < SC_1/SC_2 < -0.25,$$

where, $SC_1$ represents an offence SC against sine condition at the peripheral portion of the first region when the first laser beam is converged on the first disc, SC₂ represents an offence SC against sine condition at the peripheral portion of the first region when the second laser beam is converged on the second disc.

Further, the offence SC against the sine condition is defined by the formula below:

$$SC = nH_1/(n' \sin U') - f(1-m)$$

where, n represents a refractive index on the beam incident side medium, n' represents a refractive index on the beam emerging side medium, U' represents an angle of the emerging beam with respect to the optical axis, m represents a paraxial magnification, $H_1$ represents a ray height on a principal plane, and f represents a focal length.

Still optionally, the optical axis of the objective lens and the normal to the optical disc being included in a reference plane, the first position and the second position being located on opposite side with respect to a reference axis, and the reference axis is an optical axis of the objective lens under a hypothetical condition where the optical axis of the objective lens and the normal to the optical disc coincide with each other. Further, the reference plane is a plane including the reference axis and the first and second positions.

In this case, the first position and the second position may be arranged such that, by arranging the optical axis of the objective lens to be inclined with respect to the normal to the optical disc, the first laser beam is converged on a side where a distance between the objective lens and the optical disc increases, and the second laser beam is converged on a side where a distance between the objective lens and the optical disc decreases.

Furthermore, the objective lens is configured such that coma is minimized for a hypothetical disc under a hypothetical condition, the hypothetical disc being an optical disc having a protective layer whose thickness is intermediate between that of the first disc and that of the second disc, the hypothetical condition being a condition where the optical axis of the objective lens coincides with the normal to the optical disc.

Further optionally, the optical disc drive preferably includes a fine movement mechanism for driving the objective lens to move for focusing and tracking, the reference axis being inclined with respect to the normal to the optical disc, the objective lens being held by the fine movement mechanism such that the optical axis coincides with the reference axis.

In this case, the driving unit holds the optical disc such that the data recording surface of the optical disc extends in parallel with a bottom surface of a case of the optical disc drive.

In another case, the driving unit may hold the optical disc by inclining the data recording surface with respect to a bottom surface of a case of the optical disc drive so that the reference axis is perpendicular to a bottom surface of a case of the optical disc drive.

Alternatively, driving unit may hold the optical disc such that the data recording surface of the optical disc extends in parallel with a bottom surface of a case of the optical disc drive.

DESCRIPTION OF THE ACCOMPANYING DRAWINGS

FIG. 2A shows a plan view which is viewed from the optical disc 2; and FIG. 2B is a side view;

Figure 3:
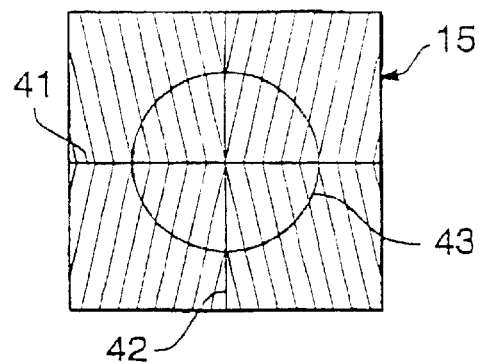
Figure 4A:
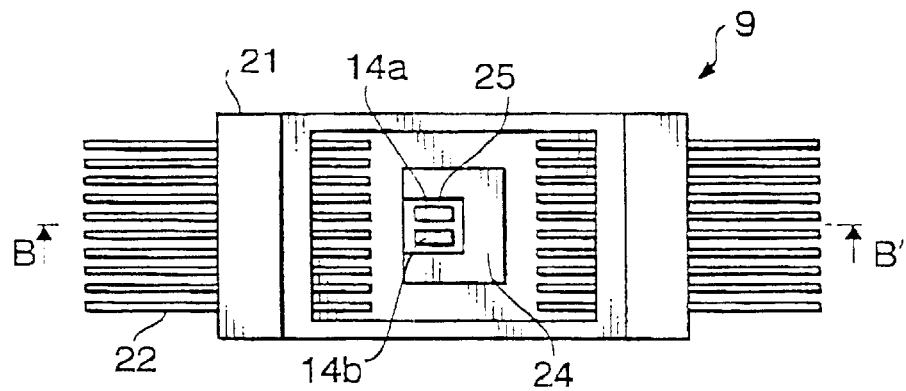
Figure 4B:
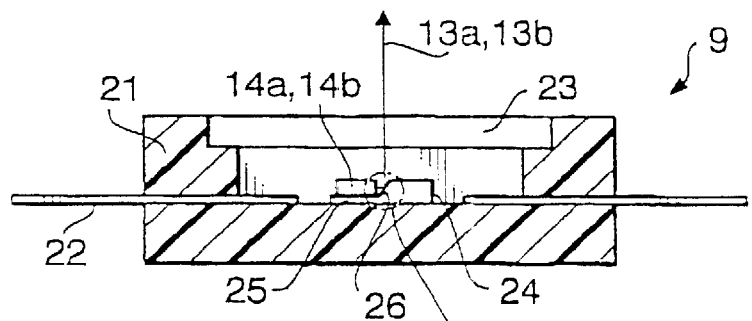
Figure 4C:
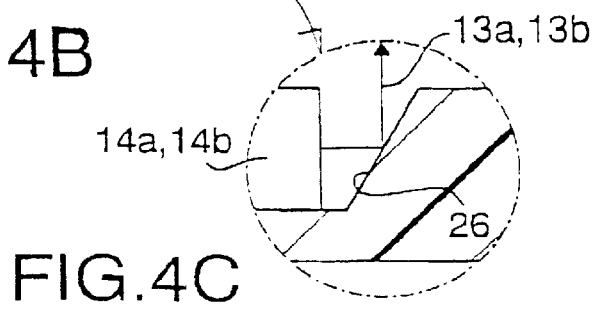

FIG. 3 schematically shows a front view of the polarizing diffractive grating of the composite optical element;

FIGS. 4A–4C show a structure of the laser module 9:

FIG. 4A is a front view;

FIG. 4B is a cross-sectional view taken along line B-B' of FIG. 4A; and

Figure 1:
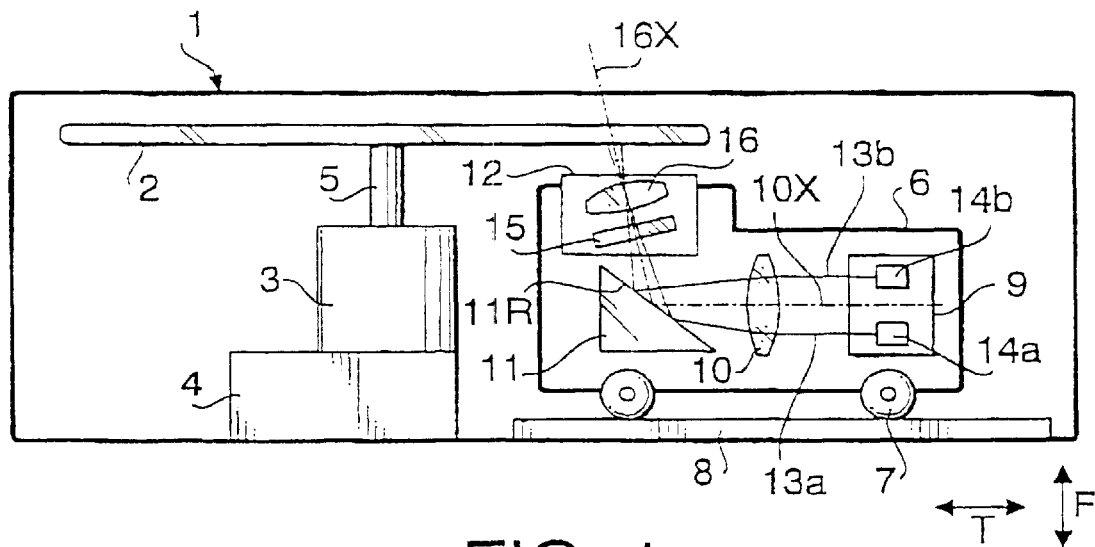
FIG. 1 is a schematic representation of an optical disc drive according to a first embodiment of the invention.
Figure 5:
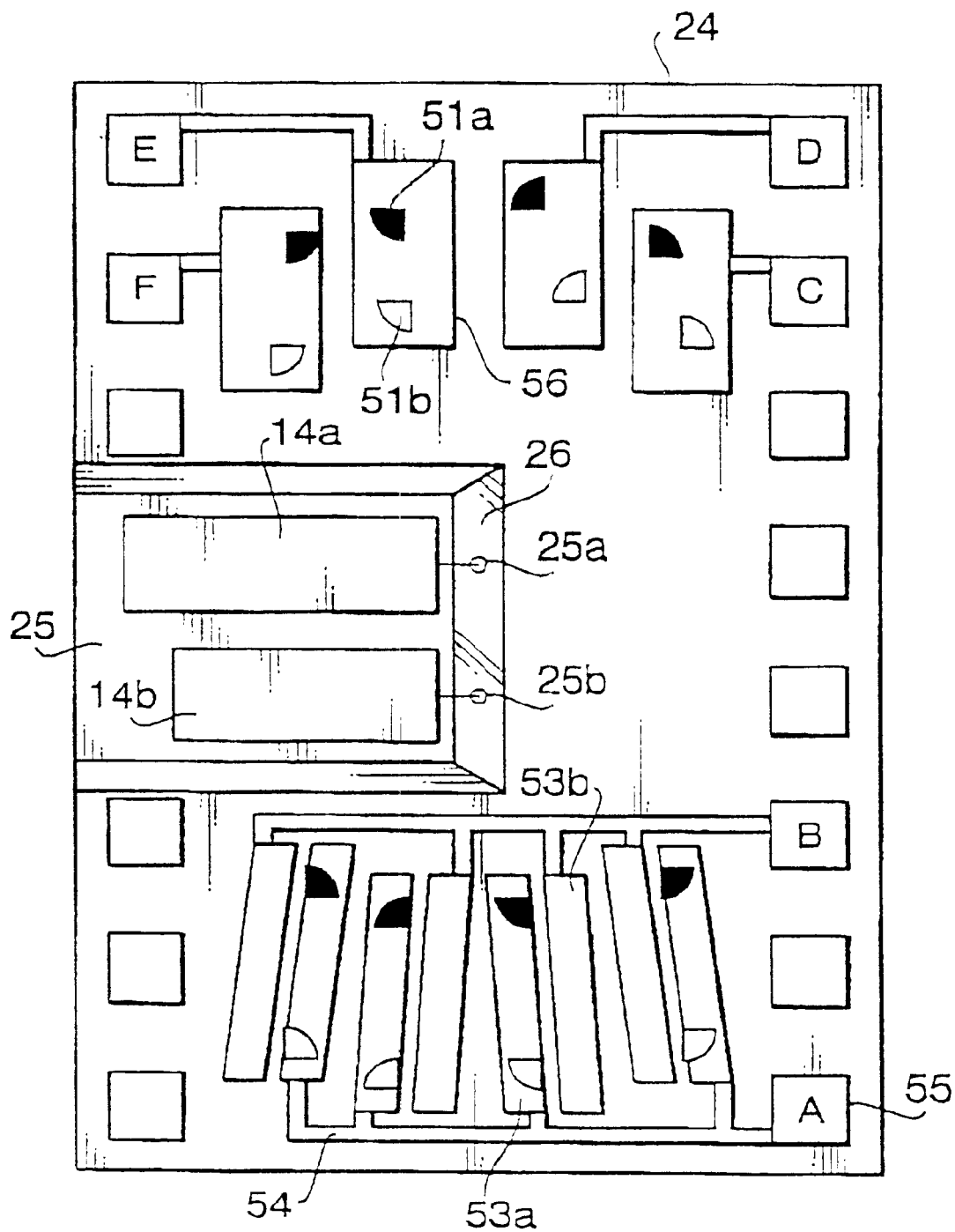
Figure 6:
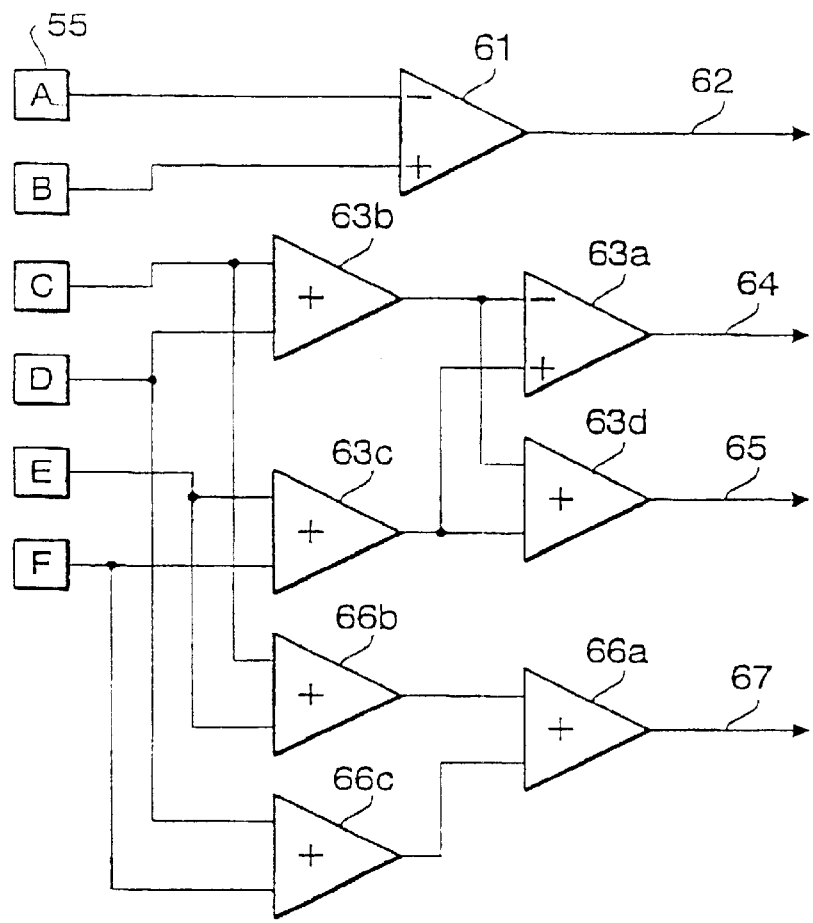
Figure 7:
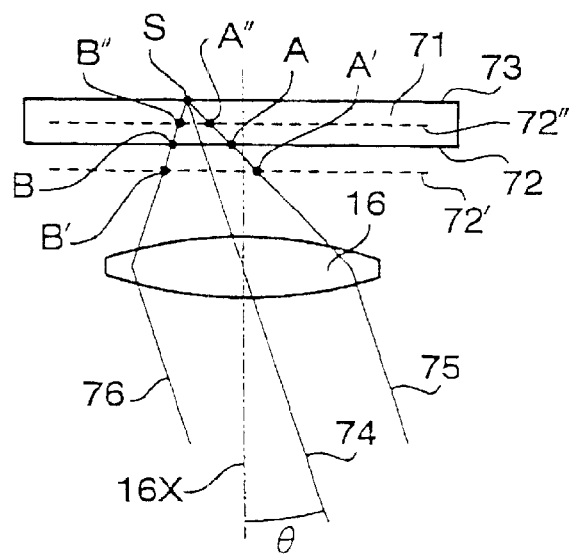
Figure 8:
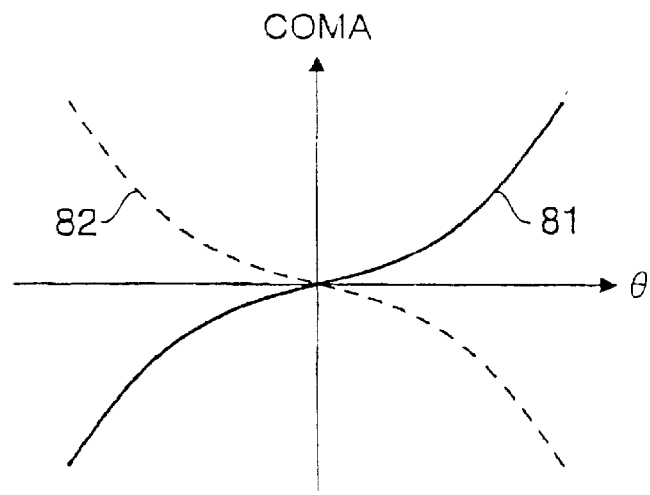
Figure 9:
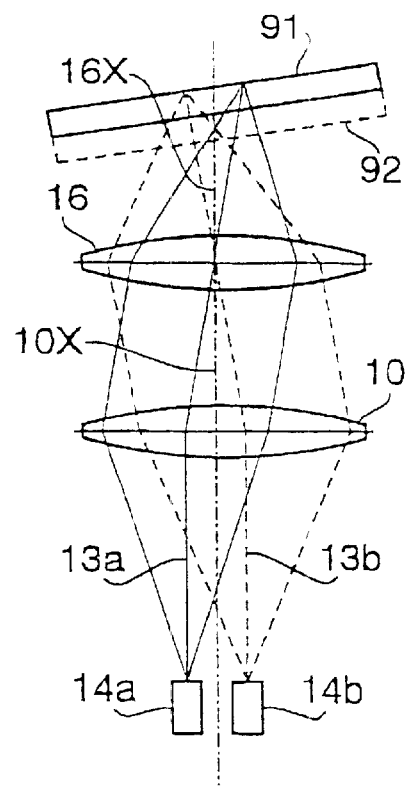
Figure 10:
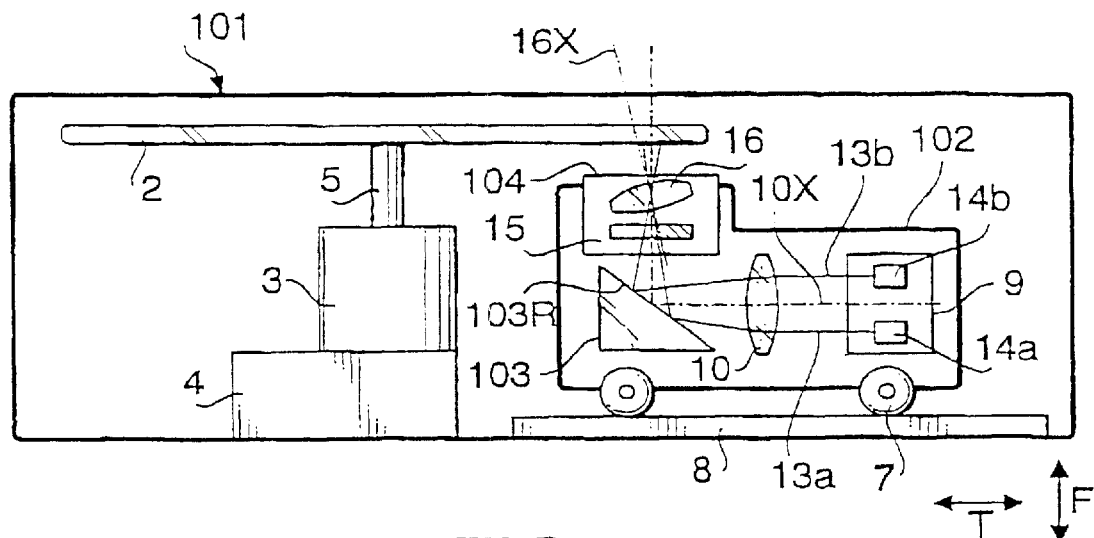
Figure 11A:
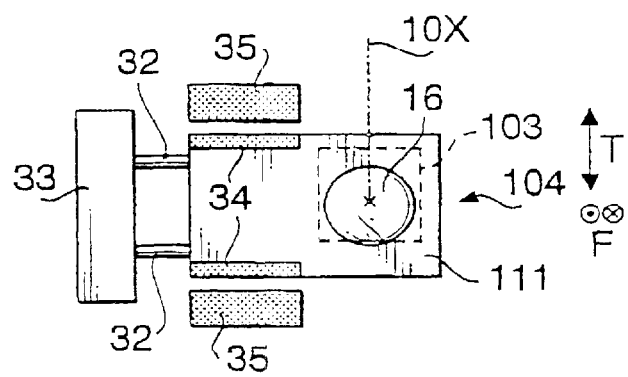
Figure 11B:
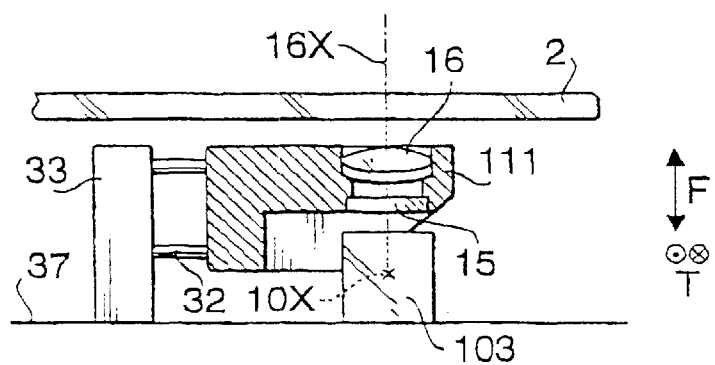

FIG. 4C is an enlarged view of a portion of FIG. 4B;

FIG. 5 is an enlarged view of the semiconductor base plate;

FIG. 6 shows a block diagram of a signal processing circuit;

FIG. 7 illustrates compensation for coma;

FIG. 8 is a graph showing a relationship between the incident angle and quantity of coma when the DVD and CD (or CD-R) are used;

FIG. 9 is a developed view of the optical system shown in FIG. 1 for illustrating optical paths;

FIG. 10 shows a schematic representation of an optical disc drive according to a second embodiment of the invention;

FIGS. 11A and 11B show the structure of the lens actuator employed in the optical disc drive shown in FIG. 10:

FIG. 11A is a plan view viewed from the optical disc side; and

Figure 12:
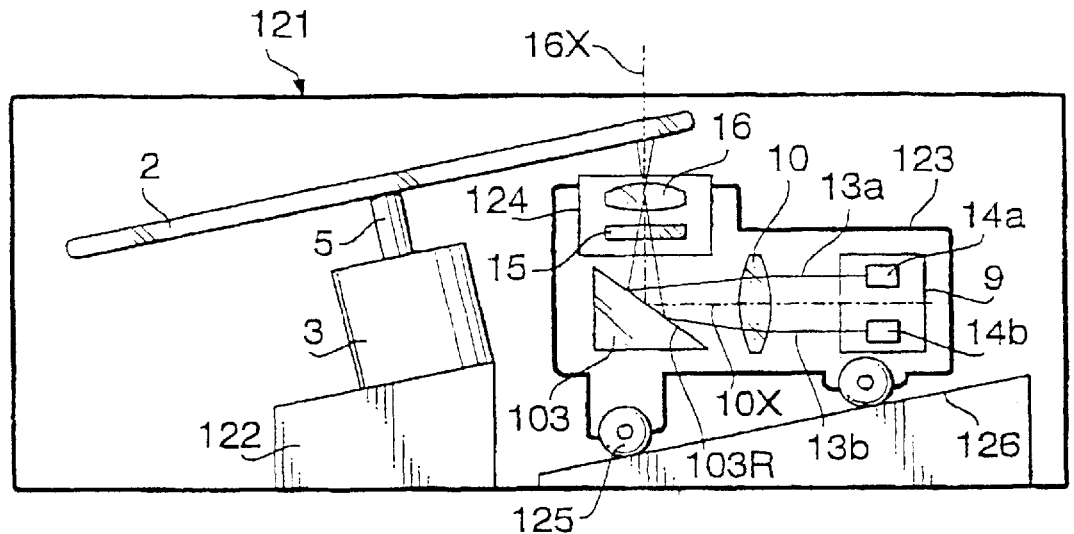
Figures 13A, 13B:
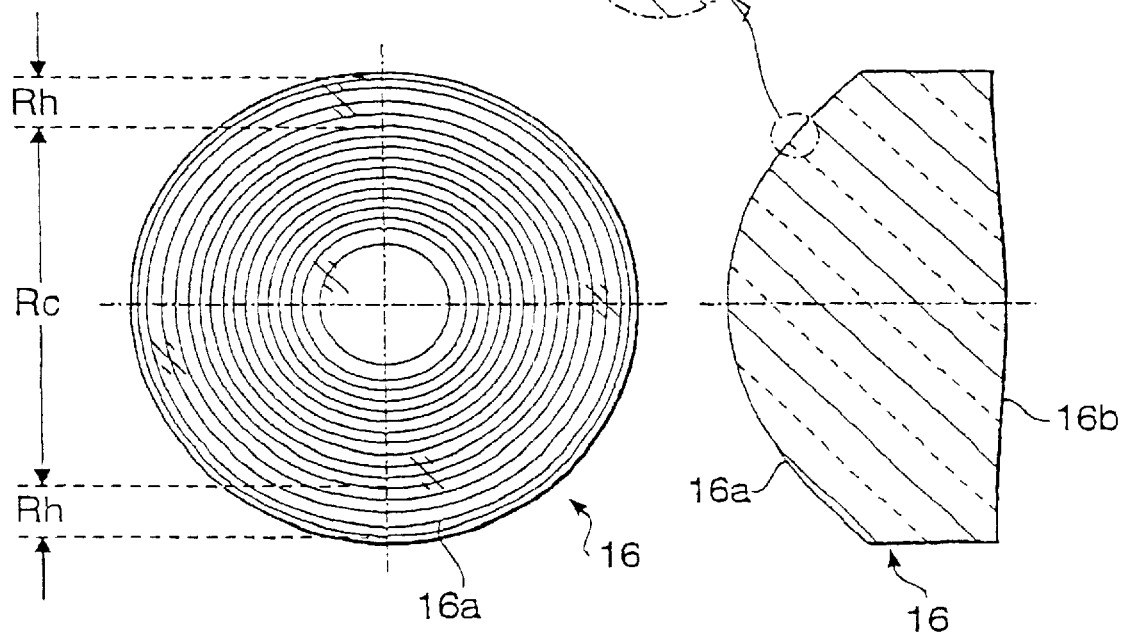
Figure 14:
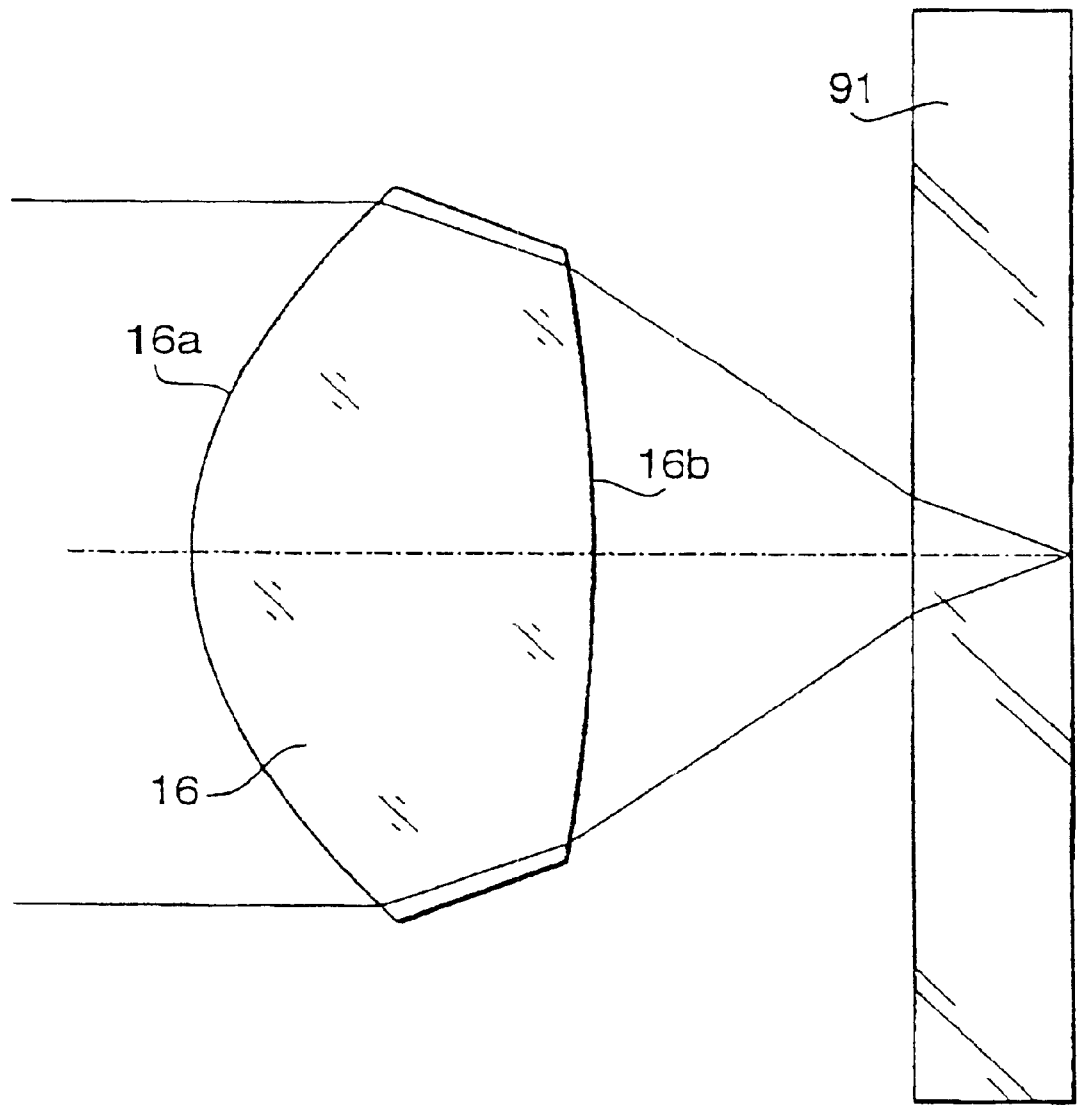
Figures 15A, 15B, 15C:
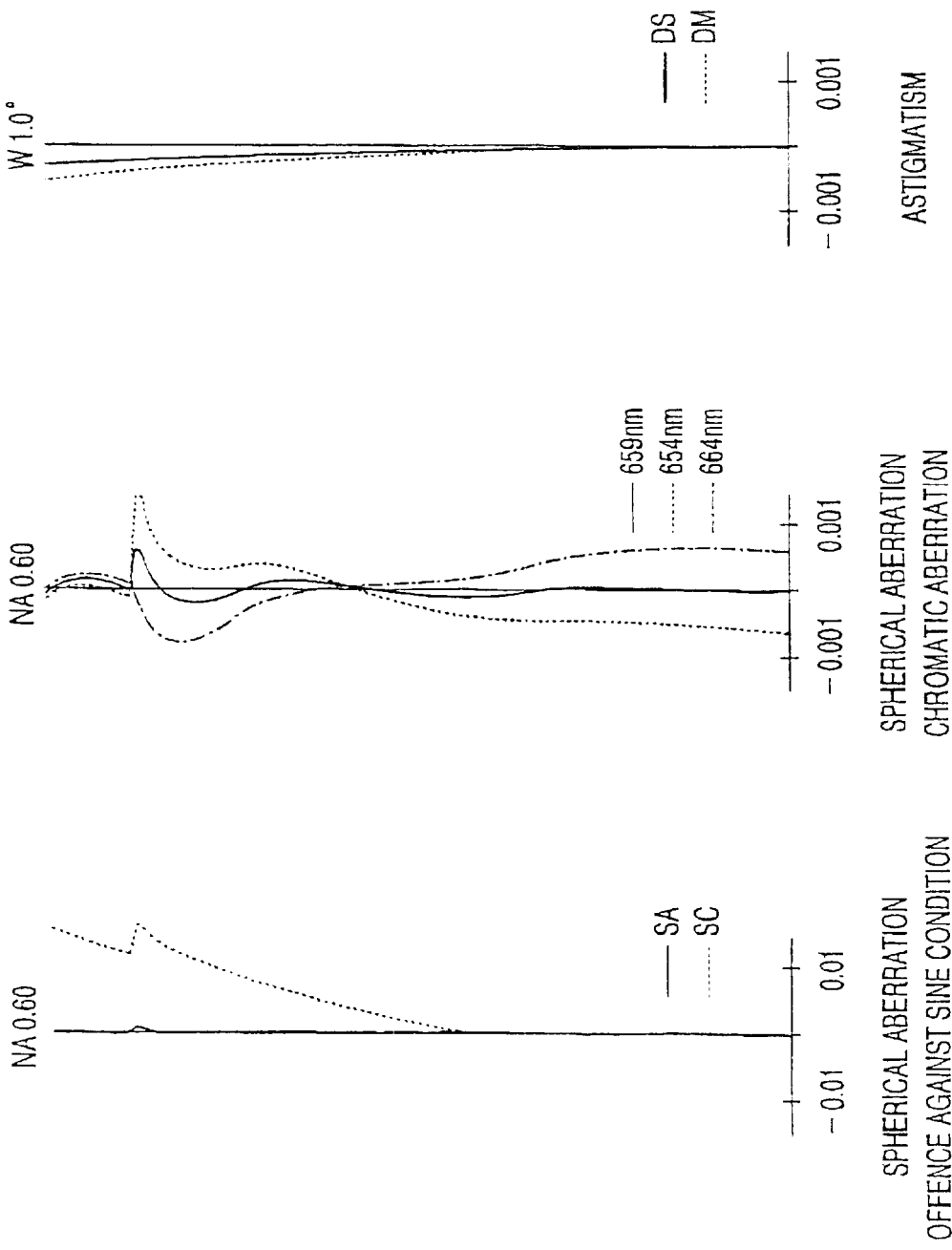
Figure 16A:
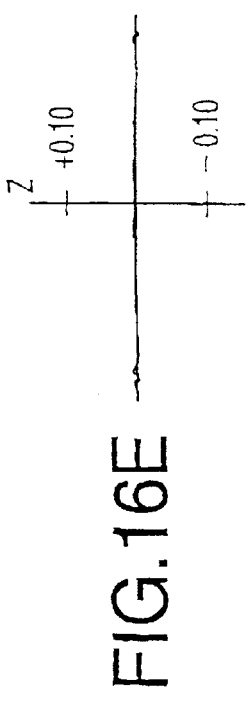
Figure 17:
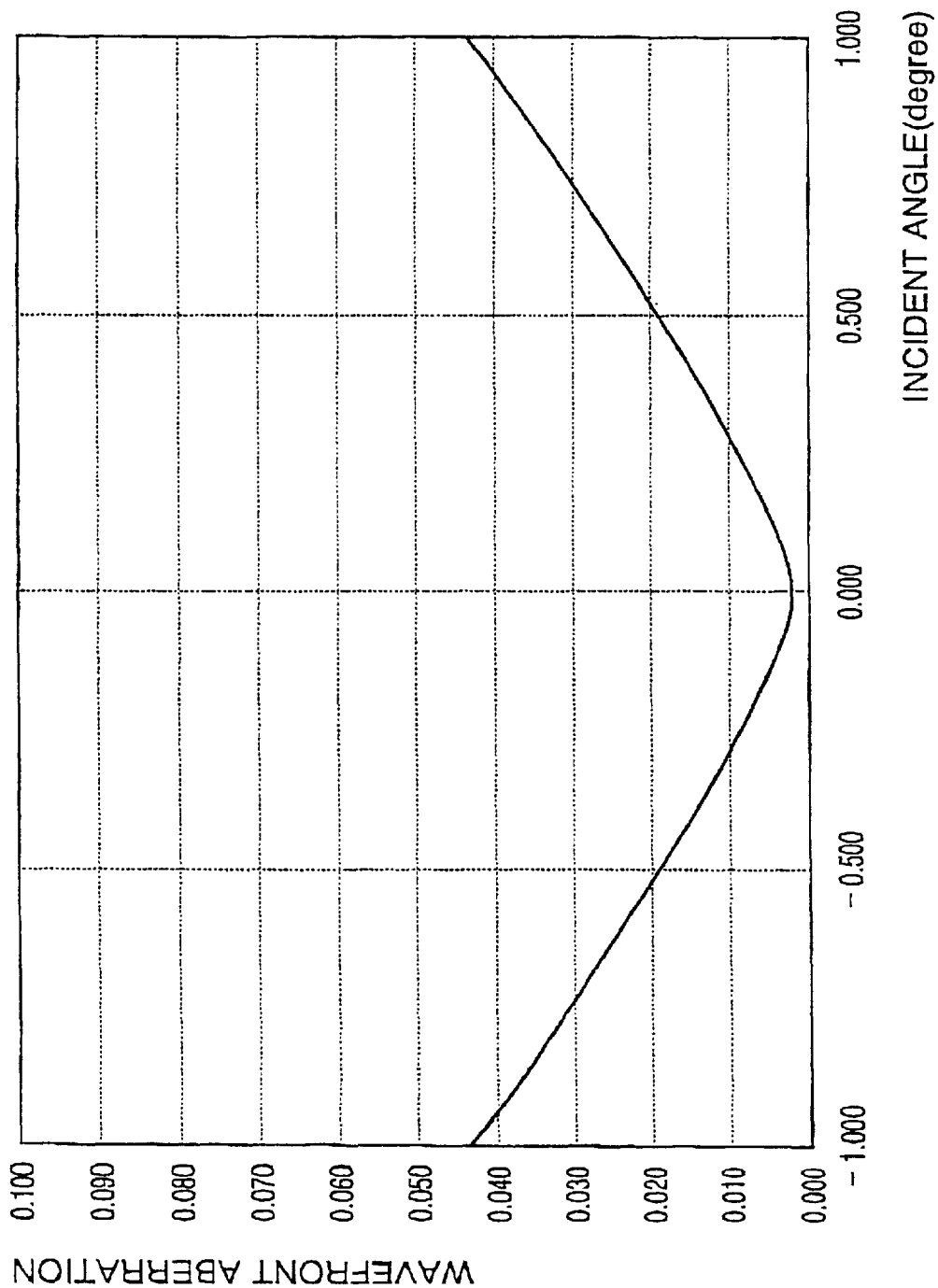
Figure 18:
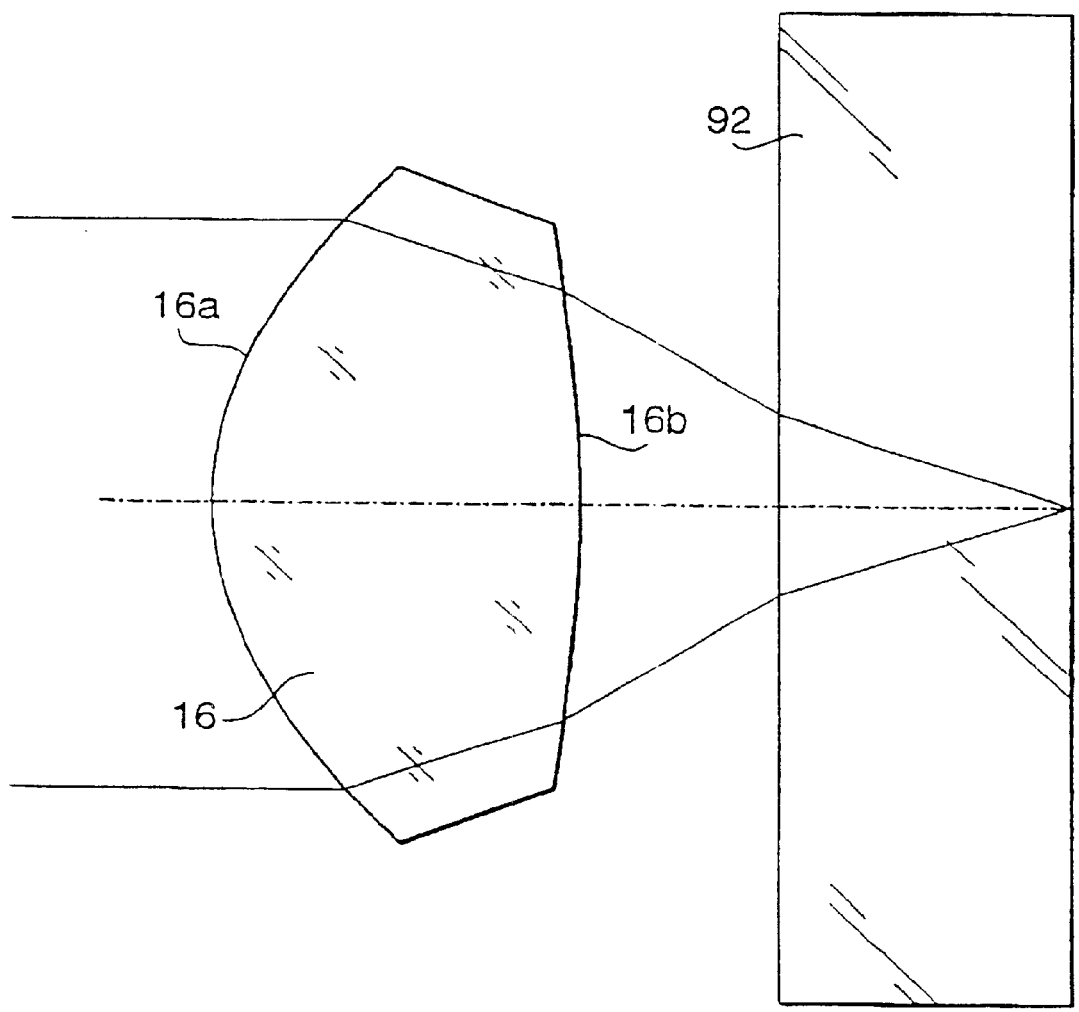
Figure 21:
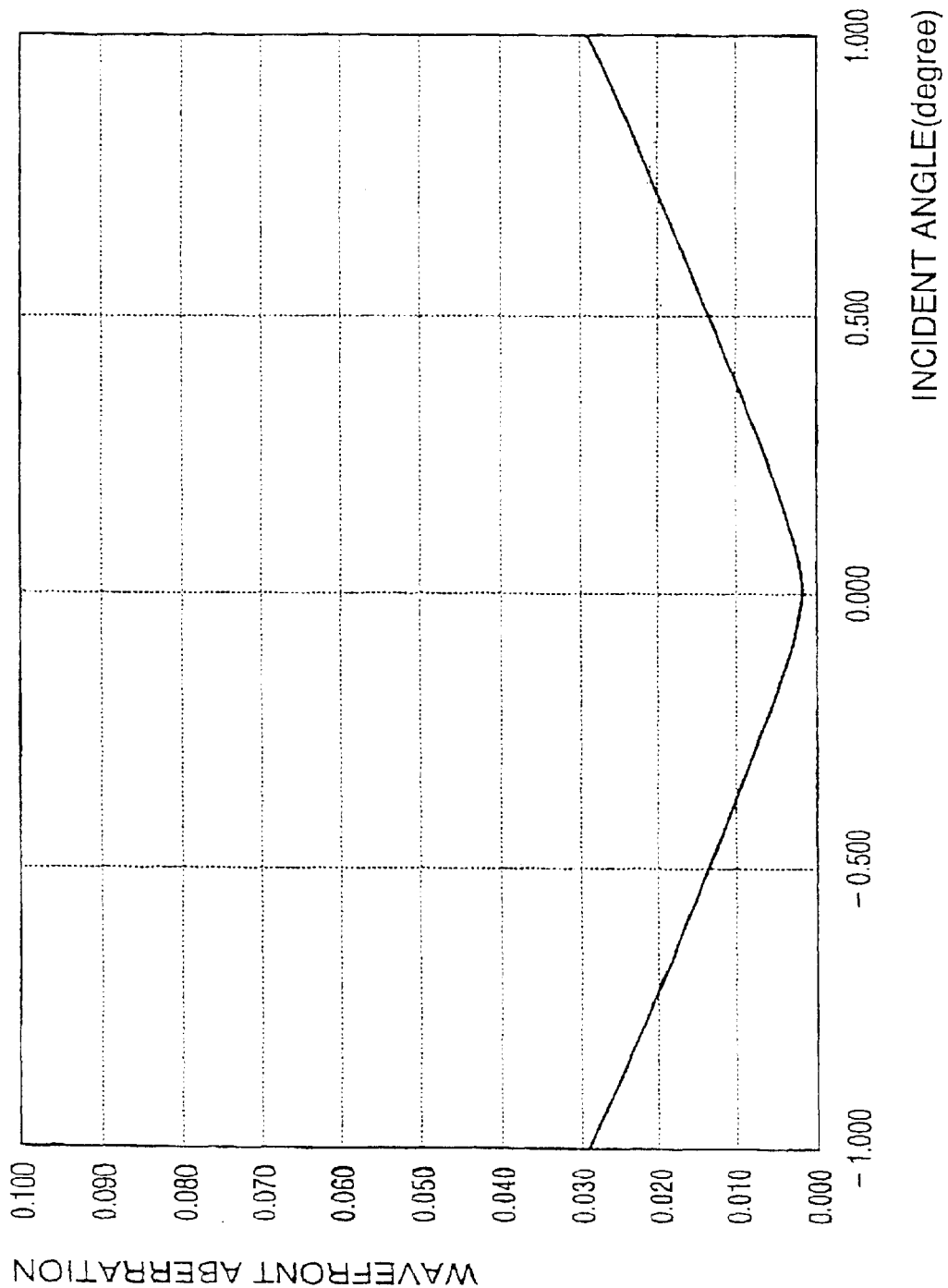
Figure 22:
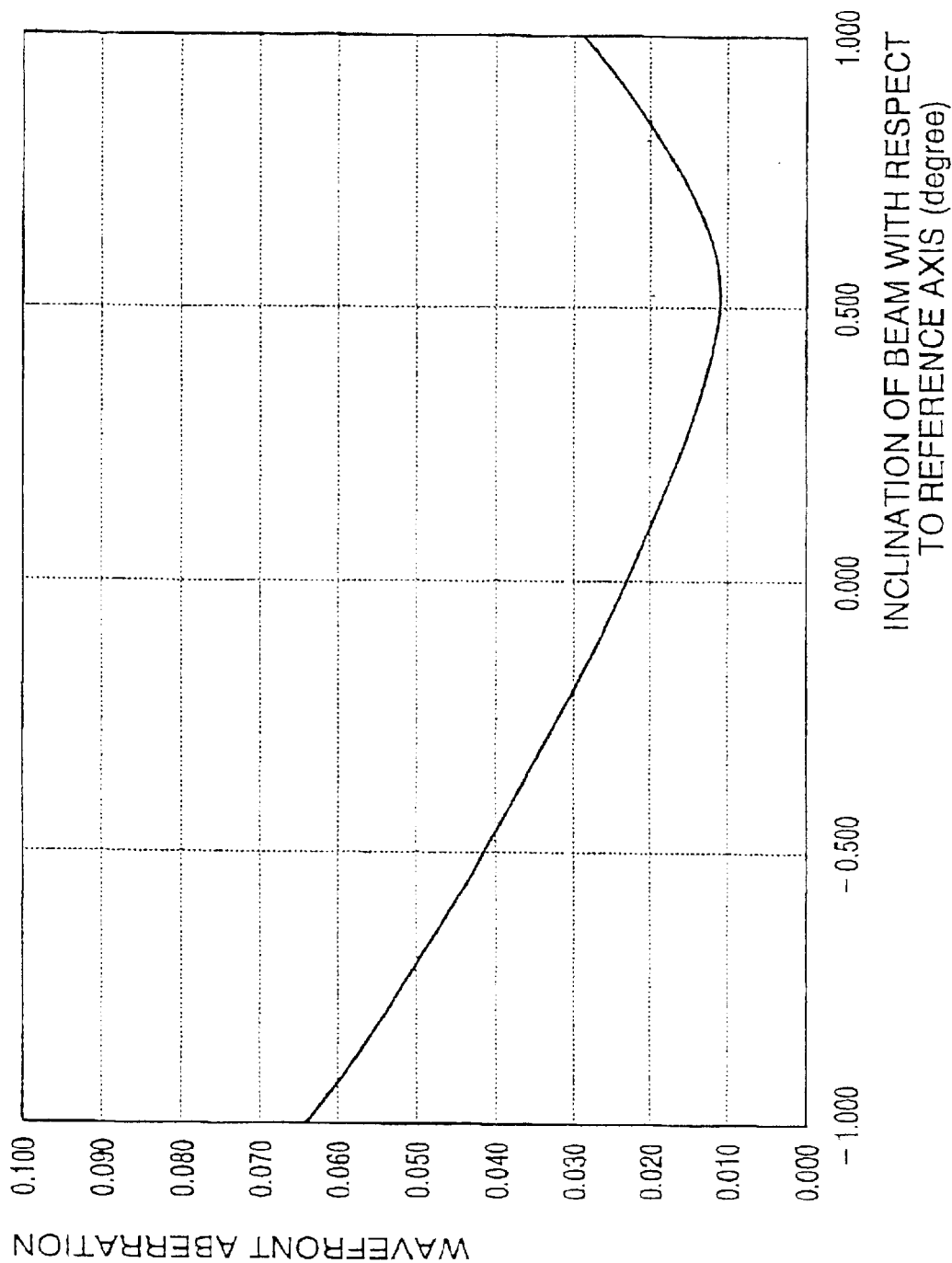
Figure 23:
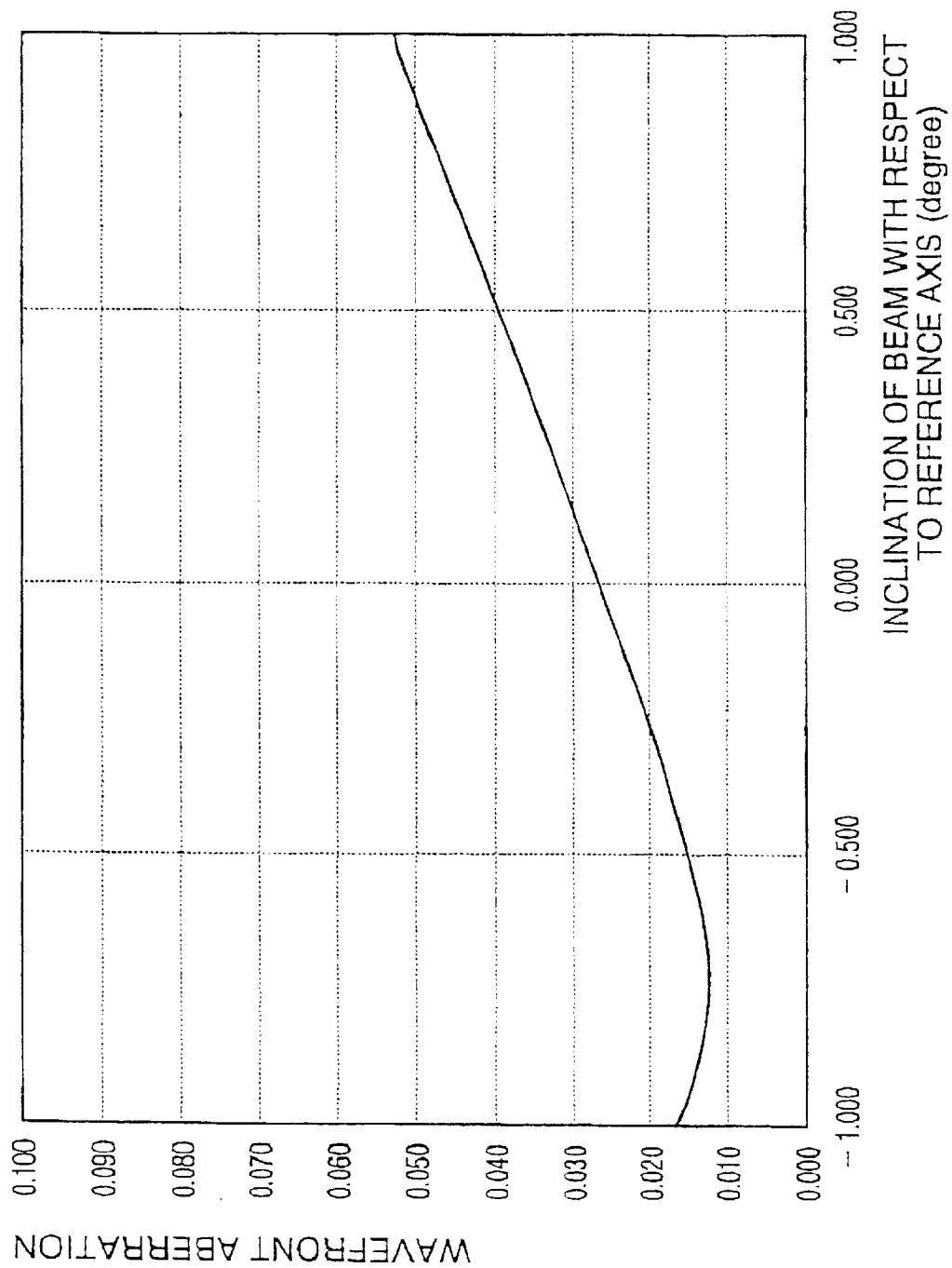
Figure 24:
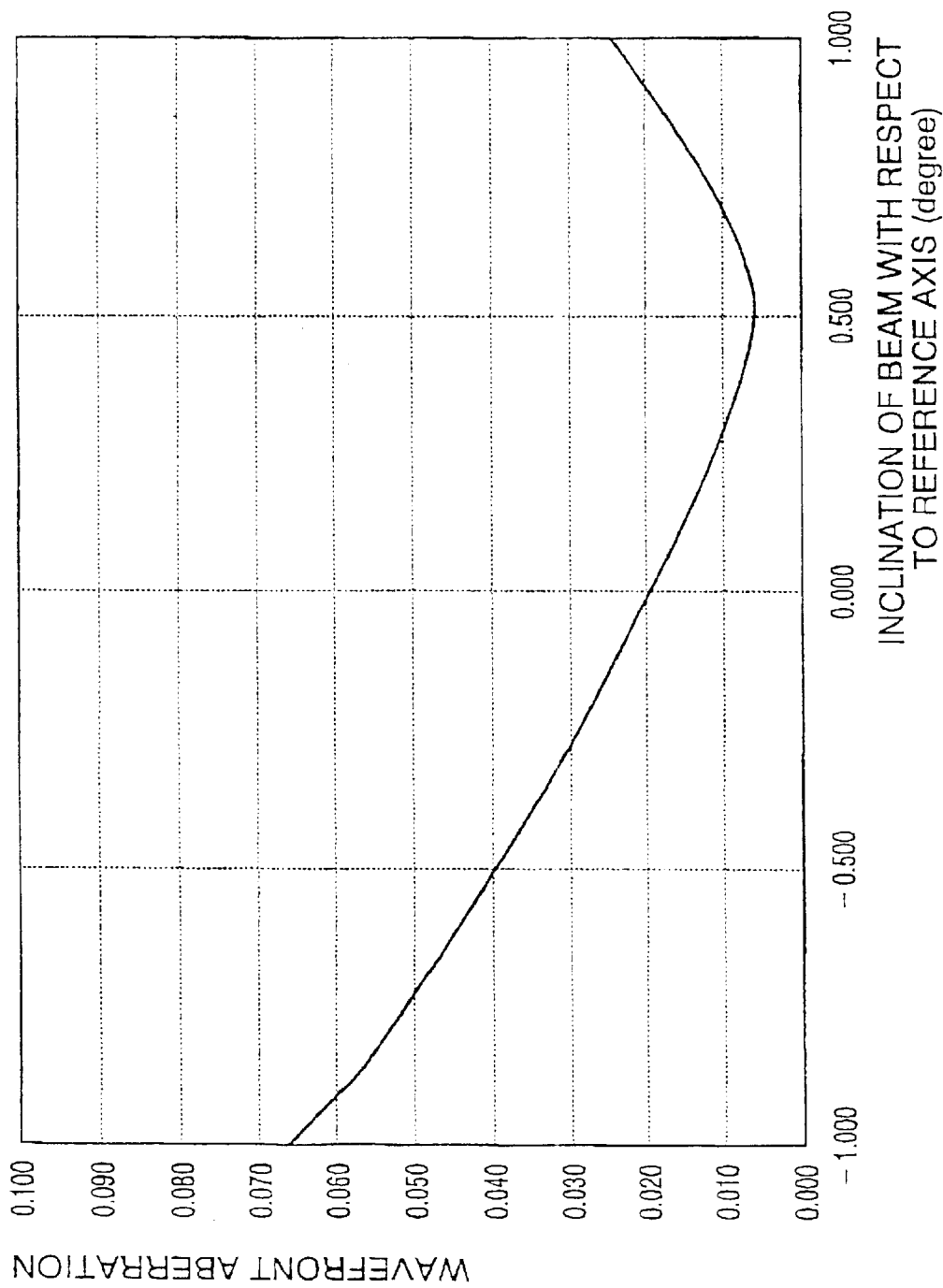
Figure 25:
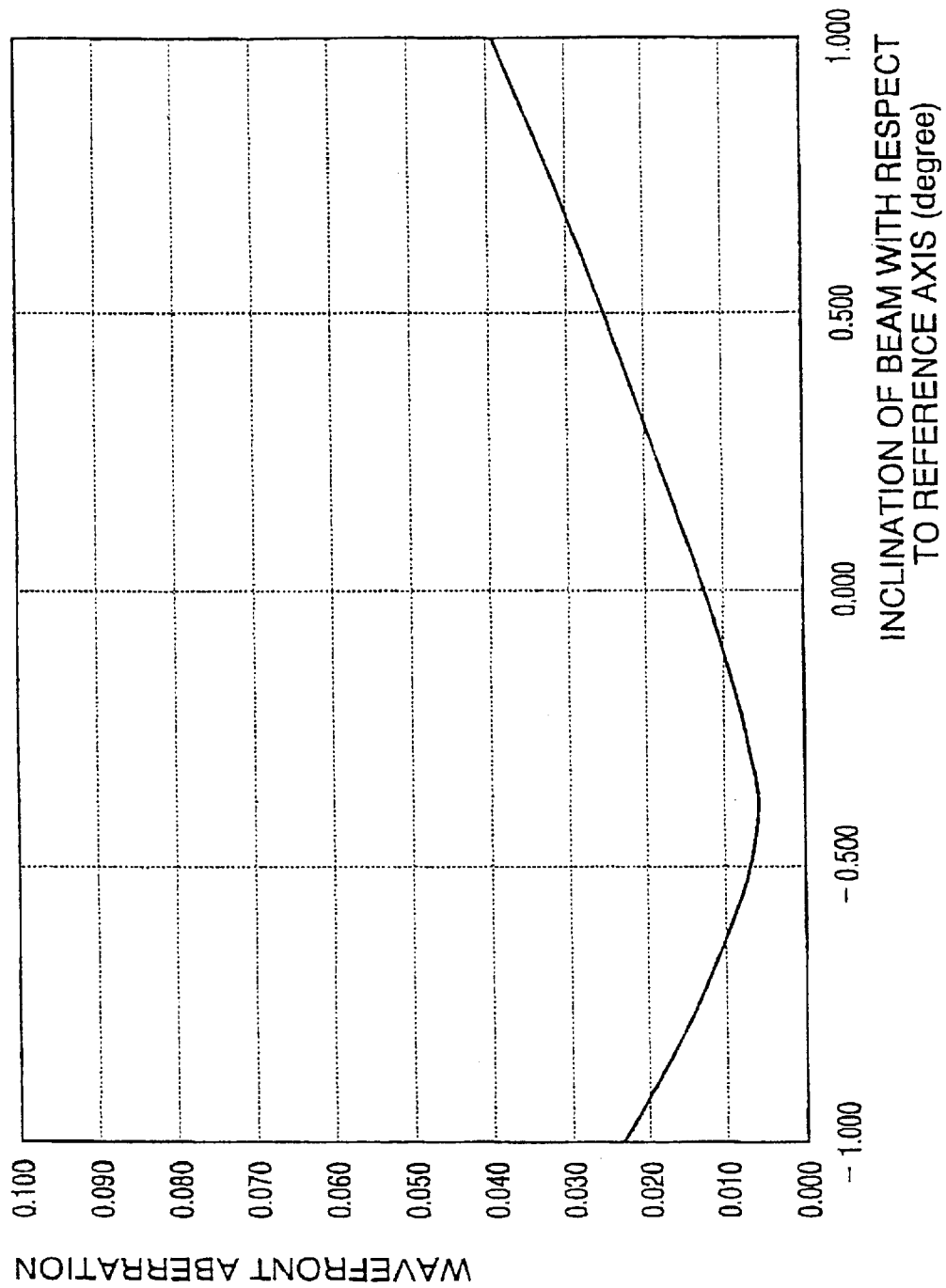

FIG. 11B is a cross-sectional side view;

FIG. 12 shows a schematic representation of an optical disc drive according to a third embodiment of the invention;

FIGS. 13A–13C show the structure of the objective lens;

FIG. 14 schematically shows the objective lens and the DVD;

FIG. 15A shows spherical aberration SA and deviation SC of sine condition at the wavelength of 659 nm;

FIG. 15B shows chromatic aberration represented by spherical aberration for wavelengths of 654 nm, 659nm and 664 nm;

FIG. 15C shows astigmatism (DS: sagittal; and DM: meridional);

FIGS. 16A–6H show wavefront aberration, under the hypothetical condition shown in FIG. 14, when the beam emitted by the first laser diode is incident on the objective lens at a predetermined incident angle;

FIG. 17 is a graph showing a relationship between the incident angle of the beam emitted from the first laser diode with respect to the objective lens and wavefront aberration when the DVD is used;

FIG. 18 schematically shows the objective lens and the second optical disc under the hypothetical condition;

FIGS. 19A–19C show aberrations of the objective lens under the hypothetical condition shown in FIG. 18 when the laser beam emitted by the second laser diode is incident on the objective lens at the incident angle of 0 degree;

FIGS. 20A–20H show wavefront aberration under the hypothetical condition shown in FIG. 18, when the beam emitted by the second laser diode is incident on the objective lens at a predetermined incident angle;

FIG. 21 is a graph showing a relationship between the incident angle of the beam emitted from the second laser diode with respect to the objective lens and wavefront aberration (rms: root-mean-square representation);

FIG. 22 shows a relationship between the wavefront aberration (rms representation) and the angle formed between the first laser beam incident on the objective lens and the reference axis, when the DVD is used, and the normal to the optical axis is inclined at 0.24 degrees with respect to the reference axis;

FIG. 23 shows a relationship between the wavefront aberration (rms representation) and the angle formed between the second laser beam incident on the objective lens and the reference axis when the CD is used, and the normal to the optical axis is inclined at 0.24 degrees with respect to the reference axis;

FIG. 24 shows a relationship between the wavefront aberration (rms representation) and the angle formed between the first laser beam incident on the objective lens and the reference axis when the DVD is used, and the optical axis of the objective lens is inclined at −0.15 degrees with respect to the reference axis; and FIG. 25 shows a relationship between the wavefront aberration (rms representation) and the angle formed between the second laser beam incident on the objective lens and the reference axis when the CD is used, and the optical axis of the objective lens is inclined at −0.15 degrees with respect to the reference axis.

DETAILED DESCRIPTION OF THE EMBODIMENTS

Referring to the accompanying drawings, embodiments of the invention will be described.

Firstly, three optical disc drives capable of recording/reproducing data to/from DVD, CD and CD-R discs according to the embodiments will be described. Thereafter, concrete examples of an objective lens used for the optical disc drives will be described.

First Embodiment

FIG. 1 schematically shows an optical disc drive 1 according to a first embodiment of the invention.

The optical disc drive 1 is provided with a motor 3 for rotating an optical disc 2, and an optical head 6 accommodating a laser module 9 and an objective lens 16. The motor 3 is mounted on a bottom surface of a casing (not numbered) of the optical disc drive 1 via a mounting base 4. The optical disc 2 is mounted to a spindle shaft 5 of the motor 3 such that the data recording surface thereof faces, in parallel with, the bottom surface of the optical disc drive 1. The optical disc 2 can be either a first disc, e.g., a DVD or a second disc, e.g., a CD or a CD-R. The first disc has a protective layer which is 0.6 mm thick, and the wavelength of the laser beam for recording/reproducing data to/from the first disc is approximately 659 nm. The second disc has a protective layer which is 1.2 mm thick, and the wavelength of the laser beam for recording/reproducing data to/from the second disc is approximately 790 nm.

The optical head 6 is driven by a rough moving mechanism 7 including a voice coil motor on a rail member 8 for seeking, in a tracking direction (indicated by arrow T). In the laser module 9 included in the optical head 6, a first laser diode 14a which emits a shorter wavelength (659 nm) laser beam 13a and a second laser diode 14b which emits a longer wavelength (790 nm) laser beam 13b. The first laser diode 14a and the second laser diode 14b are arranged such that the light emitting points thereof are located close to each other.

The optical head 6 further includes a collimating lens 10 which collimates the diverging beams emitted by the first and second laser diodes 14a and 14b, respectively, and a mirror 11 for deflecting the laser beams, which are emitted by the first and second laser diodes 14a and 14b, collimated by the collimating lens 10, and proceed in a direction parallel to the data recording surface of the optical disc 2, to direct to impinge on the objective lens 16. The objective lens 16 is secured to a lens actuator 12 together with a composite element 15, which will be described later.

The lens actuator 12 is a fine movement mechanism, which drives the objective lens 16 and the composite element 15 integrally in a direction normal to the data recording surface of the optical disc 2 and in a direction of a radius of the optical disc 2 for focusing and tracking.

The objective lens 16 converges the laser beam 13a (approx. 659 nm) emitted by the first laser diode 14a on the data recording surface of a DVD whose protective layer is relatively thin (0.6 mm), and converges the laser beam 13b (approx. 790 nm) emitted by the second laser diode 14b on the data recording surface of a CD or CD-R whose protective layer is relatively thick (1.2 mm).

The optical axis 16X of the objective lens 16 is inclined with respect to the normal to the optical disc 2. For the sake of description, a reference axis 10X and a reference plane are defined. The reference axis 10X is a hypothetical optical axis of the objective lens 16 under a hypothetical condition where the optical axis 16X coincides with the normal to the optical axis. Further, the reference plane is a plane including the reference axis 10X and the beam emitting pints of the first and second laser diodes 14a and 14b. The reference axis 10X is, in other words, an optical axis of the collimating lens 10, and the reference plane is a plane parallel to the surface of FIG. 1.

In the first embodiment, the normal to the optical disc 2 is included in the reference plane and inclined with respect to the reference axis 10X. Further, the optical axis 16X of the objective lens 16 coincides with the reference axis 10X. The reference axis 10X, which coincides with the optical axis of the collimating lens 10, is deflected by a reflection surface 11R of the mirror 11 at an angle, which is formed between the axes 10X before and after deflected, greater than 90 degrees. The deflected axis is inclined with respect to the normal to the optical disc 2. The objective lens 16 is configured such that, under the hypothetical condition, i.e., if the optical axis 16X of the objective lens 16 is normal to the optical disc 2, the coma is minimized for a hypothetical disc that is an optical disc having a protective layer whose thickness is intermediate between 0.6 mm and 1.2 mm.

With this condition, the sign of the coma is opposite between a case where the DVD is mounted and a case where the CD or CD-R is mounted in the above-defined hypothetical condition. IF the normal to the optical disc is inclined with respect to the optical axis of the objective lens, a first position of the beam emitting point of the laser beam 13a and a second position of the beam emitting point of the laser beam 13b are determined. The first position is defined such that if the beam emitting point of the lser beam 13a is located at the first position, the coma is minimized when the laser beam 13a is converged on the data recording surface of the DVD. The second position is defined such that if the beam emitting point of the laser beam 13b is located at the second position, the coma is minimized when the laser beam 13b is converged on the data recording surface of the CD or CD-R. The fist position and the second position are located on opposite sides with respect to the reference axis 10X. Therefore, the first and second laser diodes 14a and 14b are located on opposite sides with respect to the reference axis 10X. An incident angle at which the laser beam 13a is incident on the optical disc 2 is greater than an incident angle at which the laser beam 13b is incident on the optical disc 2.

With the above configuration, i.e., by inclining the normal to the optical disc 2 with respect to the optical axis 16X of the objective lens 16, the first laser beam 13a is converged on a side, with respect to the reference axis 10X, where a distance between the objective lens 16 and the optical disc 2 increases, and the second laser beam 13b is converged on a side, with respect to the reference axis 10X, where a distance between the objective lens 16 and the optical disc 2 decreases.

Figure 2A:
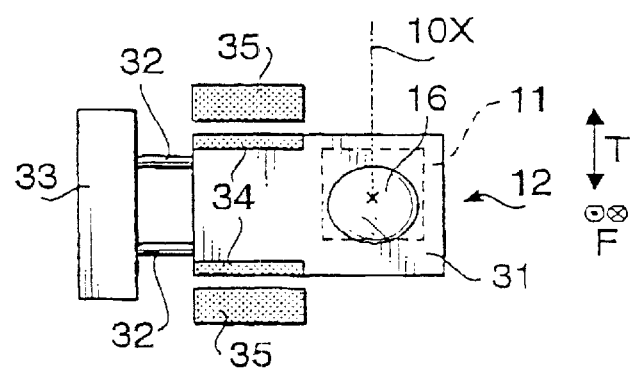
FIGS. 2A and 2B show a structure of the lens actuator 12.
Figure 2B:
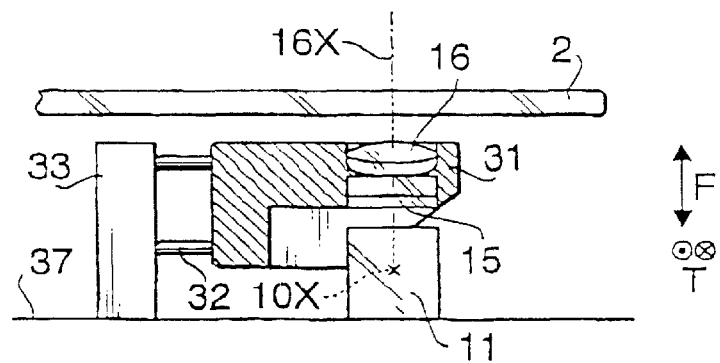

FIGS. 2A and 2B show a structure of the lens actuator 12: FIG. 2A shows a plan view which is viewed from the optical disc 2; and FIG. 2B is a side view. The objective lens 16 and the composite element 15 are integrally held by a lens holder 31. The lens holder 31 is secured onto a holding base 33 using wire spring 32. On both side surfaces of the lens holder 31, coils 34 are provided, while on both sides of the lens holder 31, at positions facing the coils 34, magnets 35 are fixedly provided. The magnets 35 and the holding base 33 are secured to the casing 37 of the optical head. By supplying electrical current to the coils 34, the lens holder 31 can be moved, due to electromagnetic force generated between the coils 34 and magnets 35, in a direction parallel to the normal to the optical disc 2 (i.e., in a focusing direction indicated by arrow F), thereby focusing being performed, and in a radial direction of the optical disc 2 (i.e., in a tracking direction indicated by arrow T), thereby tracking being performed. It should be noted that, by the quantity of electromagnetic force between the coils 34 and the magnets 35, the moving amount of the lens holder 31 in the focusing direction F is adjusted, and by the balance between the forces generated between each pair of coil 34 and magnet 35, the moving amount of the lens holder 31 in the tracking direction T is adjusted.

The composite element 15 is an element having a ¼ wavelength plate and a polarizing diffractive grating. The polarizing diffractive grating is configured as shown in FIG. 3. That is, an area of the diffractive grating is divided into four sub-areas by two boundaries 41 and 42 crossing at right angles. A circled portion 43 indicated in FIG. 3 represent an area on which the laser beam 13a is incident. The incident beam is emerged from the polarizing diffraction grating. The ordinary rays are emerged from the polarizing grating as they are, while the extraordinary rays are emerged from each of the sub-areas as +1st and −1st order diffraction components. Grid patterns of the diffraction grating structures at the four sub-areas are different, but pitches are identical. Therefore, the eight diffraction components emerged from the diffraction grating are diffracted in different directions but the diffraction angles thereof are the same. The eight diffraction components are collimated by the collimating lens 10 and converged inside the laser module 9 as eight beam spots.

FIGS. 4A–4C show a structure of the laser module 9: FIG. 4A is a front view; FIG. 4B is a cross-sectional view taken along line B-B' of FIG. 4A; and FIG. 4C is an enlarged view of a portion of FIG. 4B.

The laser module 9 Includes a package 21 formed of heat conductive material such as aluminum nitride, and a plurality of lead lines 22 penetrated through the package 21 to transmits electrical signals. Inside the package 21, a semiconductor base plate 24 made of silicon or the like is formed. The upper surface of the package 21 is covered with a glass plate 23 which transmits light. On the semiconductor base plate 24, a recessed portion 25 is formed. Between the upper surface and bottom surface of the recessed portion 25, an inclined surface 26 is formed (see partially enlarged view of FIG. 4C). The inclined surface 26 is formed to be a mirror surface, which inclines with respect to the bottom surface at 45 degrees. The laser diodes 14a and 14b are mounted on the bottom surface of the recessed portion 25 such that beam emitting points thereof face the mirror surface 26. The laser beams 13a and 13b are emitted toward the mirror surface 26 (i.e., in the right-hand side in FIG. 4B), which are reflected by the mirror surface 26 and directed upward in the figure through the glass plate 23.

FIG. 5 is an enlarged view of the semiconductor base plate 24. On the semiconductor base plate 24, four pairs of photo detectors 53a and 53b for obtaining focusing error signals, and four photo detectors 56 for obtaining tracking error signals and data reproducing signal are formed. The photo detectors 53a and 53b are connected as shown in FIG. 5 using conductive thin layer 54 made of aluminum or the like, and further connected to terminals A and B of a pat for bonding wires. The four photo detectors 56 are connected to terminals C, D, E and F, respectively.

Each pair of the photo detectors 53a and 53b are formed as a pair of rectangular light receiving areas aligned in a direction of the shorter side of the rectangle, since the focusing error is detected in accordance with the double knife edge method. When the beam spots are focused on the data recording surface of the optical disc, the quarter-circular beam spots are focused on the pairs of rectangular areas, respectively. If the focal plane of the beam spots is away from the data recording surface, the size of the beam spots on the detectors increases: if the focal plane is located in front of the data recording surface, the beam spots on each pair of detecting areas shift in one detecting area side; and if the focal plane is located on a rear side of the data recording surface, the beam spots on each pair of detecting areas shift in the other detecting area side. By calculating a difference between (a) a sum of outputs of detecting areas which receive greater amount of light when the focal plane is in front of the data recording surface, and (b) a sum of outputs of detecting areas which receive greater amount of light when the focal plane is located on the rear side of the data recording surface, the focusing error signal is obtained. Since the focusing error signal is obtained based on outputs of a plurality of pairs of detecting areas, effects of the positional errors of beam spots can be cancelled. Therefore, a relatively high accuracy of the focusing error signal can be maintained without precise adjustment of the positions of the detectors.

The laser beams 13a and 13b emitted by the laser diodes 14a and 14b are reflected by the mirror 26 at points 52a and 52b, respectively, and directed in a direction perpendicular to the surface of FIG. 5. The eight filled-in quarter-circles 51a indicate beam spots formed by beams divided by the composite element 15 into eight after emitted by the laser diode 14a and reflected by the optical disc 2 (DVD). The filled-in quarter-circles 51a are aligned on a circle centered about the position 52a. The eight hollow quarter-circles 51b indicate beam spots formed by beams divided by the composite element 15 into eight after emitted by the laser diode 14b and reflected by the optical disc 2 (CD, CD-R). The hollow quarter-circles 51b are aligned on a circle centered about the position 52b. Among eight beam spots corresponding to each of the laser beams 13a and 13b, spots formed by four −1st order components are converged on the pairs of the photo detectors 53a and 53b, respectively, while the remaining four +1st order components are converged on the four photo detectors 56, respectively.

The signals from terminals A–F are processed by a signal processing circuit shown in FIG. 6.

A differential amplifier 61 receives signals from terminals A and B, and outputs a difference between the received signals. The output signal represents a focusing error signal 62, which is obtained in accordance with a knife-edge method.

A differential amplifier 63a receives the output of an adder 63b, which adds signals from the terminals C and D, and the output of an adder 63c, which add signals from the terminals E and F. The output of the differential amplifier 63a represents a tracking error signal 64, which is obtained in accordance with a push-pull method when the optical disc has guide grooves. The adder 63d adds the output signals of the adders 63b and 63c to output data reproducing signal 65. A differential amplifier 66a receives the output of an adder 66b which adds the signals from terminals C and E, and the output of an adder 66c which adds the signals from the terminals D and F. The output of the differential amplifier 66a represents a tracking error signal 67 which is obtained in accordance with a DPD (differential phase detection) method when the optical disc is provided with guiding pit.

By supplying focusing error signal and the tracking error signal detected as described above to the coils 34 of the lens actuator 12, the objective lens 16 is moved in the direction of the optical axis and/or in the radial direction of the optical disc 2, thereby focusing and tracking being achieved.

When data is recorded on the DVD or CD-R, the intensity of the laser beam emitted by the laser diode 14a or 14b is modulated in accordance with the data to be recorded. When the data recorded on the optical disc 2 is reproduced, the intensity of the laser beam emitted by the first laser diode 14a or the second laser diode 14b is maintained at a predetermined constant level, and the data is reproduced based on the data reproducing signal 65, which is detected as described above.

FIG. 7 is a drawing for illustrating compensation of a coma.

Firstly, it is assumed that there is a disc 71 (which is a hypothetical disc) having a protective layer, whose thickness is between the thickness of the protective layer of the CD (i.e., 0.6 mm) and that of the DVD (i.e., 1.2 mm), and the normal to the hypothetical disc 71 coincides with the optical axis 16X of the objective lens 16. Further, it is assumed that a beam is incident on the objective lens 16 having an angle θ with respect to the optical axis 16X, and 74 denotes a principal ray of the beam, and 75 and 76 denote rim rays. Points A and B represent points at which the rays 75 and 76 intersect with the beam incident side surface of the hypothetical disc 71, respectively.

If the coma of the objective lens, with respect to the disc 61, is compensated for, the beam which is incident on the objective lens 16 with a certain incident angle, the beam is converged at point S through the protective layer. Such an objective lens can be configured by forming an aspherical surface and/or combining a plurality of spherical lenses.

If a disc 71 is replaced with a CD or CD-R having a relatively thick protective layer, a position of the beam incident side surface is shifted from 72 to 72', thereby aberration being caused. For the sake of description, the points where the rays 75 and 76 intersect the surface 72' are represented by A' and B'.

If the incident angle θ of the beam incident on the objective lens 16 is zero, the aberration generated is mainly spherical aberration which is symmetrical with respect to the principal ray 74. In such a case, the aberration can be compensated for by changing degree of divergence or convergence of the incident beam, or using diffractive grating having annular zones. However, if the incident angle θ is not zero, as shown in FIG. 7, the increase of the optical path between points A'-A is greater than the increase of the optical path between points B'-B, and therefore coma is caused. Assuming that the sign of the coma in this condition is negative, then, if the incident beam inclines, with respect to the optical axis 16X, in a direction opposite to that shown in FIG. 7, the sign of the coma is positive.

If the disc 71 is replaced with a DVD that has a thinner protective layer, the position of the beam incident side surface 72 is changed to 72", thereby aberration being caused. It is assumed that the points where the rays 75 and 76 intersect the surface 72"are A" and B". Then, if the incident angle θ of the beam incident on the objective lens 16 is not zero, as shown in FIG. 7, the reduction of the optical path length within A-A" is greater than that in B-B", thereby coma being caused. The sign of this coma is positive. If the inclination of the beam is opposite with respect to the optical axis 16X, then the coma is negative.

FIG. 8 is a graph showing a relationship between the incident angle θ and quantity of coma with the sign thereof when the DVD and CD (or CD-R) are used instead of the hypothetical disc 71. The horizontal axis represents the incident angle θ and the vertical axis represents the quantity of coma. In the graph shown in FIG. 8, a curve 81 indicated by solid line represents the characteristic when the DVD replaces the disc 71, and a curve 82 indicated by broken lines represents the characteristic when the CD (or CD-R) replaces the disc 71.

For example, if the incident angle θ is positive when the DVD is used, positive coma is caused. If the incident angle θ is negative when the CD is used, positive coma is caused, too. It should be noted that the quantity of coma for a predetermined incident angle can be varied by changing the shape of the objective lens 16. For example, if the objective lens 16 is configured to compensate for the coma caused by the optical disc 71 having a relatively thick protective layer, the inclination of the curve 81 will be steeper, and the inclination of the curve 82 will be gentler than those shown in FIG. 8. On the contrary, if the protection layer of the disc 71 is assumed to be thinner, and the objective lens 16 is designed to compensate for the coma caused by the thus modified optical disc 71, the inclination of the curve 81 is gentler and the inclination of the curve 82 will be steeper than those shown in FIG. 8.

FIG. 9 is a developed view of the optical system shown in FIG. 1, illustrating the optical paths. The reference axis 10X and the optical axis 16X of the objective lens 16 coincide with each other. Further, the laser diodes 14a and 14b are arranged on opposite sides with respect to the reference axis 10X. With this configuration, the laser beam 13a emitted by the first laser diode 14a and the laser beam 13b emitted by the second laser diode 14b are both collimated by the collimating lens 10, and incident on the objective lens 16 with being inclined in opposite directions with respect to the reference axis 10X. Therefore, for each of the laser beams 13a and 13b, positive coma is caused.

Further, the DVD 91 and the CD 92 are inclined, with respect to the reference axis 10X, in the same direction. With this inclined arrangement, negative coma is caused when either of the DVD 91 and the CD 92 is used. Therefore, the positive coma caused by the inclination of the beams with respect to the reference axis 10X can be cancelled by the inclined arrangement of the optical discs.

Between the DVD and the CD, the thickness of the protective layers and the numerical apertures are different. Therefore, with respect to the same incident angle θ, the quantity of the coma caused thereby are different. However, as afore-mentioned, the quantity of coma can be adjusted by changing the shape of the objective lens 16, and therefore, the coma can be cancelled for both the DVD and CD.

Second Embodiment

FIG. 10 shows an optical disc drive 101 according to a second embodiment of the invention, and FIGS. 11A and 11B show a lens actuator 104 employed in the optical disc drive 101.

The basic structure of the optical disc drive 101 is similar to that of the optical disc drive 1 according to the first embodiment. The optical disc 2 is secured to a spindle shaft 5 of a motor 3, which is mounted on a mounting base 4. An optical head 102 is movable long the rail member 8.

Inside the optical head 102, a laser module 9, a collimating lens 10, a mirror 103, a lens actuator 104 are incorporated. The lens actuator 104 holds the objective lens 16 and the composite element 15. The laser module 9 and the collimating lens 10 are similar to those employed in the optical disc drive 1 according to the first embodiment.

In the second embodiment, the optical axis 16X of the objective lens is inclined with respect to the reference axis 10X in the reference plane, and the normal to the optical disc 2 coincides with the reference axis 10X. The reference axis 10X is bent by 90 degrees on the refection surface 103R of the mirror 103, and extends in a direction parallel to the normal to the optical disc 2. The objective lens 16 is configured such that, the coma is minimized for a hypothetical disc whose protective layer has an intermediate thickness between 0.6 mm and 1.2 mm in a hypothetical condition where the optical axis 16X coincides with the normal to the optical disc 2.

With the above configuration, in the hypothetical condition where the optical axis 16X coincides with the normal to the optical disc 2, the sign of the coma when the DVD is used and when the CD (or the CD-R) is used is different. In this condition, if the optical axis 16X is inclined with respect to the reference axis 10X, a first position of the beam emitting point of the laser beam 13a and a second position of the beam emitting point of the laser beam 13b are determined. The first position is defined such that if the beam emitting point of the laser beam 13a is located at the first position, the coma is minimized when the laser beam 13a is converged on the data recording surface of the DVD. The second position is defined such that if the beam emitting point of the laser beam 13b is located at the second position, the coma is minimized when the laser beam 13b is converged on the data recording surface of the CD or CD-R. The fist position and the second position are located on opposite sides with respect to the reference axis 10X. Therefore, the first and second laser diodes 14a and 14b are located on opposite side with respect to the reference axis 10X.

The optical axis 16X is inclined such that the incident angle of the laser beam 13a with respect to the objective lens 16 is smaller than the incident angle of the laser beam 13b with respect to the objective lens 16. With this configuration, i.e., by inclining the optical axis 16X of the objective lens 16 relative to the normal to the optical disc 2, the first laser beam 13a is converged on a side where the distance between the objective lens and the optical disc increases, and the second laser beam 13b is converged on a side where the distance between the objective lens 16 and the optical disc 2 decreases. With this arrangement, the coma which is caused since the laser beams are incident on the objective lens 16 with being inclined with respect to the reference axis 10X can be cancelled.

FIGS. 11A and 11B show the structure of the lens actuator 104: FIG. 11A is a plan view viewed from the optical disc side; and FIG. 11B is a cross-sectional side view.

Similarly to the first embodiment, the objective lens 16 and the composite element 15 are integrally held by the lens holder 111, which is mounted by wire springs 32 onto the holding base 33. The objective lens 16 is inclined with respect to the reference axis 10X, while the composite element 15 is not inclined. The structure and arrangement of the coils 34 and the magnets 35 are similar to those in the first embodiment.

Third Embodiment

FIG. 12 schematically shows a configuration of an optical disc drive 121 according to a third embodiment of the invention.

The optical disc 5 is secured to the spindle shaft 5 of the motor 3, which is mounted on the mounting base 122. An optical head 123 is driven to move on a rail member 126 by a rough movement mechanism 125.

In the optical head 123, a laser module 9, a collimating lens 10, a mirror 103, a lens actuator 124 are provided. The lens actuator 124 holds an objective lens 16 and a composite element 15. The laser module 9, the collimating lens 10 and the mirror 103 function similarly to those described with reference to FIG. 10. It should be noted, however, in the third embodiment, the arrangement of the laser diodes 14a and 14b are opposite to that in the other embodiments.

According to the third embodiment, the normal to the optical disc 2 is inclined with respect to the reference axis 10X in the reference plane. Further, the optical axis 16X of the objective lens 16 coincides with the reference axis 10X. Furthermore, the optical disc 2 is supported as being inclined with respect to the bottom surface of the casing of the optical disc drive 121 such that the reference axis 10X is perpendicular to the bottom surface of the casing of the optical disc drive 121. Due to the above arrangement, the surface of the mounting base 122 on which the motor 3 is mounted is inclined with respect to the bottom surface of the casing of the optical disc drive 121, and the rail member 126 is also inclined so that the optical head 123 is movable in a direction parallel to the data recording surface of the optical disc 2.

The reference axis 10X, which is inclined with respect to the normal to the optical axis 2, is bent by the reflection surface 103R of the mirror 103 at 90 degrees. The objective lens 16 is configured such that, in a hypothetical condition where the optical axis 16X coincides with the normal to the optical disc 2, the coma is minimized for a hypothetical disc whose protective layer has an intermediate thickness between 0.6 mm and 1.2 mm.

With the above configuration, in the hypothetical condition where the optical axis 16X coincides with the normal to the optical disc 2, the signs of the coma when the DVD is used and when the CD (or CD-R) is used are different.

If the normal to the optical disc 2 is inclined with respect to the reference axis 10X, a first position of the beam emitting point, at which the coma is minimized when the laser beam 13a is converged on the data recording surface of the DVD, and a second position of the beam emitting point, at which the coma is minimized when the laser beam 13b is converged on the data recording surface of the CD (or CD-R) are determined on opposite side with respect to the reference axis 10X, are determined. The laser diodes 14a and 14b are arranged such that the light emitting points thereof are located at the first and second positions above. Therefore, the laser diodes 14a and 14b are located on opposite sides with respect to the reference axis 10X.

The normal to the optical disc 2 is inclined with respect to the reference axis 10X in a direction where the incident angle of the laser beam 13a with respect to the optical disc 2 is greater than the incident angle of the laser beam 13b with respect to the optical disc 2. With this configuration, by inclining the optical axis of the objective lens relative to the normal to the optical disc, the first laser beam is converged on a side where a distance between the objective lens and the optical disc increases, and the second laser beam is converged on a side where a distance between the objective lens and the optical disc decreases. By arranging the optical disc 2 to incline, the coma which is caused as the laser beam is incident on the objective lens 16 with being inclined with respect to the reference axis 10X can be cancelled.

Next, the structure of the objective lens 16 will be described in detail.

FIGS. 13A–13C show the structure of the objective lens 16. FIG. 13A is a front view, FIG. 13B is a cross-section taken along the central line in FIG. 13A, and FIG. 13C is a partially enlarged view of the surface of the objective lens 16. The objective lens 16 is a single lens element having two convex aspherical surfaces 16a and 16b made of synthetic resin. On the surface 16a, annular zones, which are concentric with respect to the optical axis of the objective lens 16, are formed as shown in FIG. 13C to provide a diffractive lens structure. As schematically shown in FIG. 13C, at borders between the annular zones, steps extending in parallel with the optical axis are formed as in the Fresnel lens structure.

The spherical aberration of the optical system of the optical disc drive changes toward an overcorrected direction as the thickness of the protective layer increases. While, for the DVD which has a relatively thin protective layer, the laser beam having a shorter wavelength is used, and for the CD which has a relatively thick protective layer, the laser beam having a longer wavelength is used. Therefore, the optical system is configured such that the spherical aberration is compensated for when the DVD is used and therefore the shorter wavelength beam is used. Further, the diffractive lens structure is given the characteristic such that the spherical aberration changes to undercorrected direction when the wavelength increases. With this configuration, the spherical aberration which changes to the overcorrected direction when the optical disc is changed from DVD to CD (i.e., the thickness of the protective layer increases) can be cancelled by the spherical aberration provided by the diffractive lens structure, which changes in the undercorrected direction when the optical disc is changed from DVD to CD (i.e., the wavelength of the laser beam increases).

The surface of the objective lens 16 can be divided into a common region Rc and a high NA region Rh. The common region Rc provides a relatively low NA which is necessary and sufficient for forming a valid beam spot on the optical disc having a relatively low recording density, i.e., the CD, CD-R, and the like. The high NA region Rh provides together with the common region Rc, a relatively high NA which Is necessary for forming a valid beam spot on the optical disc having a relatively high recording density, i.e., DVD. The diffractive lens structure is formed on the whole area of the first surface 16a, including the common region Rc and the high NA region Rh.

The objective lens 16 is formed to satisfy the following condition (1) under the hypothetical condition where the optical axis of the objective lens 16 and the normal to the optical disc 2 coincide with each other.

$$-4.0 < SC_1/SC_2 < -0.25 \quad (1)$$

where, $SC_1$ represents an offense SC against sine condition at the peripheral portion of the common region Rc when the shorter wavelength (e.g., 790 nm) laser beam is converged on the first optical disc (e.g., CD), $SC_2$ represents an offense SC against sine condition at the peripheral portion of the common region Rc when the longer wavelength (e.g., 659 nm) laser beam is converged on the second optical disc (e.g., DVD), and the offense SC against the sine condition is defined by the formula below.

$$SC = nH_1/(n' \sin U') - f(1-m)$$

where, n represents a refractive index on the beam incident side medium (i.e. the air), n' represents a refractive index on the beam emerging side medium (i.e., the protective layer), U' represents an angle of the emerging beam with respect to the optical axis, m represents a paraxial magnification, $H_1$ represents a ray height on a principal plane, and f represents a focal length.

NUMERICAL EXAMPLE

Hereinafter, a concrete embodiment in accordance with the above-described embodiments will be described.

FIG. 14 schematically shows the objective lens 16 and the DVD 91 in the hypothetical condition where the optical axis 16X of the objective lens 16 coincides with the normal to the DVD 91. The diffractive lens structure is formed on the surface 16a, and the first order diffractive component is converged on the data recording surface of the DVD 91. The surface 16b is formed as an aspherical surface without steps.

The numerical structure of the objective lens 16 is indicated in Tables 1–3. Table 1 indicates an overall specification of the objective lens 16. Tables 2 and 3 indicate the data of the first and second surfaces 16a and 16b, respectively. The common region Rc is a region for 0≦h<1.25 (unit: mm), and the high NA region Rh is a region for 1.25≦h<1.40 (unit: mm). In Tables, $\lambda_1$, $NA_1$, $f_1$ represent the wavelength, NA, focal length when the first disc (e.g., DVD) is used, and $\lambda_2$, $NA_2$, $f_2$ represent the wavelength, NA, focal length when the second disc (e.g., CD) is used. Further, nλ represents the refractive index for the wavelength λ.

TABLE 1

| | | |
|---|---|---|
| λ1 = 659 nm | NA1: 0.60 | f1 = 2.343 mm |
| λ2 = 790 nm | NA2: 0.53 | f2 = 2.360 mm |
| distance between 1st and 2nd surfaces | | 1.400 mm |
| refractive index | n659 = 1.54048 | |
| | n790 = 1.53654 | |
| Abbe number ν: | 55.6 | |
| thickness of protective layer | | |
| DVD: | 0.600 mm | |
| CD: | 1.200 mm | |

The base curves (i.e., the shape of a refractive lens excluding the diffractive lens structure) and the diffractive lens structures in common region Rc and in the high NA region Rh of the first surface 16a have different shapes and functions.

The aspherical surface defining the base curve is expressed by the following equation.

$$X(h) = \frac{Ch^2}{1 + \sqrt{1-(1+K)C^2h^2}} + A_4h^4 + A_6h^6 + A_8h^8 + A_{10}h^{10} + A_{12}h^{12}$$

where, h represents a height of a point on the aspherical surface with respect to the optical axis, X(h) represents a SAG (i.e., a distance of the point from a plane tangential to the aspherical surface at the optical axis), C represents a curvature (i.e., 1/r, r being a radius of curvature), K represents a conical coefficient, and $A_4$, $A_6$, $A_8$, $A_{10}$, $A_{12}$ represent 4th, 6th, 8th 10th, 12th order aspherical coefficients, respectively.

Further, an additional optical path length, which is added by the diffractive lens structure, is represented by a optical path difference function φ(h) below.

$$\phi(h)=(P_2 h^2+P_4 h^4+P_6 h^6+\ldots)\times m\times\lambda$$

where, h represents a height from the optical axis, $P_n$ represents an n-th (n being even) order optical path difference coefficient, m represents the order of diffraction, and λ represents a wavelength.

The optical path difference function φ(h) represents an optical path difference between a diffracted ray, at the ray height of h, and a ray when the ray would not be diffracted by the diffractive lens structure.

In Table 2, the aspherical coefficient, the optical path difference function coefficients for the first surface 16a are indicated. λB represents a blaze wavelength of the diffractive lens structure.

TABLE 2

First surface 16a

| | common region (0 ≦ h < 1.25) | high NA region (1.25 ≦ h < 1.40) |
|---|---|---|
| r | 1.498 | 1.541 |
| κ | −0.500 | −0.500 |
| $A_4$ | −1.0030 × 10⁻³ | −2.3100 × 10⁻³ |
| $A_6$ | −8.9000 × 10⁻⁴ | 6.0600 × 10⁻⁵ |
| $A_8$ | −2.0960 × 10⁻³ | −1.0900 × 10⁻⁴ |
| $A_{10}$ | 1.1530 × 10⁻³ | 1.0300 × 10⁻⁴ |
| $A_{12}$ | −4.7260 × 10⁻⁴ | −2.2500 × 10⁻⁴ |
| $P_2$ | 0.0000 | −7.6387 |
| $P_4$ | −6.9320 | −1.5000 |
| $P_6$ | −1.2190 | 0.0000 |
| $P_8$ | 0.0000 | 0.0000 |
| $P_{10}$ | 0.0000 | 0.0000 |
| λB | 720 nm | 659 nm |

TABLE 3

Second surface 16b

| | entire region |
|---|---|
| r | −5.396 |
| κ | 0.0000 |
| $A_4$ | −3.4870 × 10⁻² |
| $A_6$ | −4.5550 × 10⁻³ |
| $A_8$ | −8.0120 × 10⁻³ |
| $A_{10}$ | 4.1480 × 10⁻³ |
| $A_{12}$ | −7.0080 × 10⁻⁴ |

FIGS. 15A–15C show, under the hypothetical condition shown in FIG. 14, aberrations of an optical system including the objective lens 16 and the optical disc when the laser beam 13a is incident on the objective lens 16 at the incident angle of 0 degree, and when the first optical disc (e.g., DVD) 91 is used.

FIG. 15A shows spherical aberration SA and offense SC against sine condition at the wavelength of 659 nm; FIG. 15B shows chromatic aberration represented by spherical aberration for wavelengths of 659 nm, 654 nm and 664 nm; and FIG. 15C shows astigmatism (DS: sagittal; and DM: meridional). In each graph, the horizontal axis represents amount of aberration (unit: mm), and the vertical axes of FIGS. 15A and 15B represent the numerical apertures, and the vertical axis of FIG. 15c represents the angle W of view.

Figure 16B:
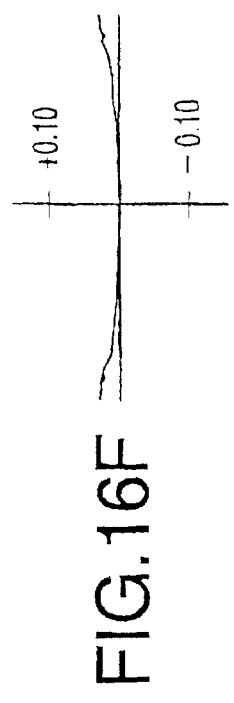
Figure 16C:
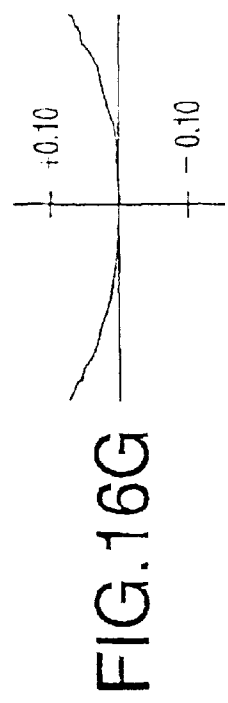
Figure 16D:
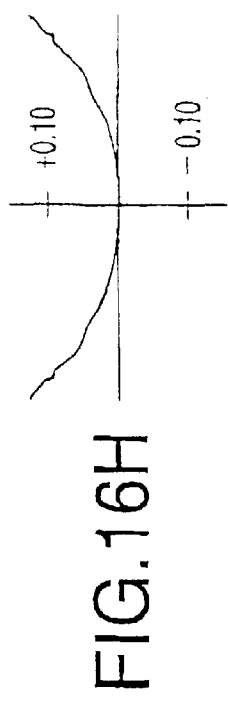
Figure 16E:
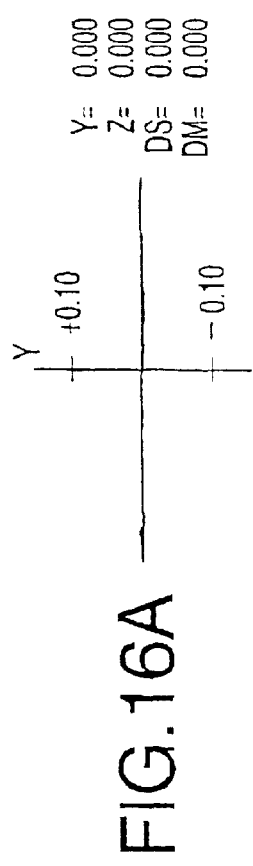
Figure 16F:
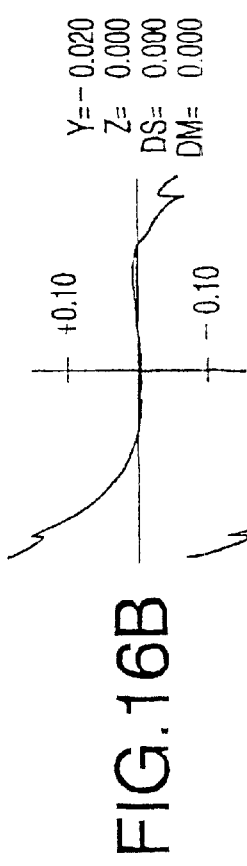
Figure 16G:
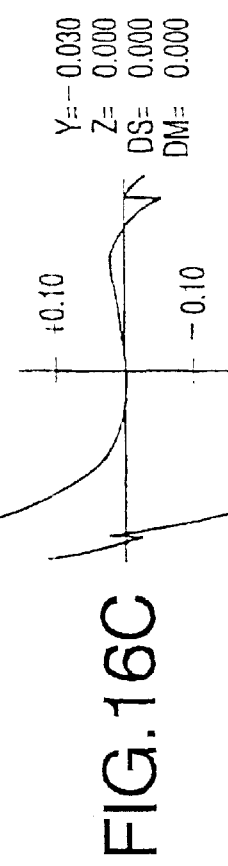
Figure 16H:
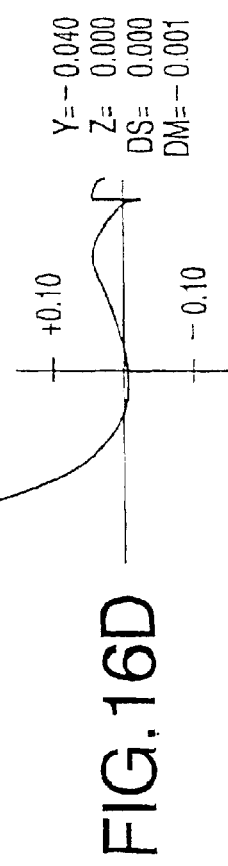

FIGS. 16A–16H show wavefront aberration, under the hypothetical condition shown in FIG. 14, when the beam emitted by the first laser diode 14a is incident on the objective lens 16 at a predetermined incident angle (FIGS. 16A–16D: meridional direction; and FIGS. 16E–16H: sagittal direction). In each graph, the horizontal axis represents an entrance pupil, and the vertical axis represents the amount of wavefront aberration. Further, FIGS. 16A and 16E are graphs when the incident angle is 0°, FIGS. 16B and 16F are graphs when the incident angle is 0.50, FIGS. 16C and 16G are graphs when the incident angle is 0.750 and FIGS. 16D and 16H are graphs when the incident angle is 1.0°.

FIG. 17 is a graph showing a relationship between the incident angle of the beam emitted from the first laser diode 14a with respect to the objective lens 16 and wavefront aberration (rms: root-mean-square value) when the DVD is used. As shown in FIG. 15A, since the objective lens 16 exhibits the positive coma for the first beam (i.e., for DVD), as the incident angle increases as shown in FIGS. 15B–15D, and FIG. 17, the absolute value of the wavefront aberration increases significantly.

FIG. 18 schematically shows the objective lens 16 and the second optical disc (i.e., CD) 92, under the hypothetical condition where the optical axis 16X of the objective lens 16 coincides with the normal to the optical disc 92.

FIGS. 19A–19C show aberrations of the optical system including the objective lens 16 and the protective layer of the optical disc, under the hypothetical condition shown in FIG. 18, when the laser beam emitted by the second laser diode 14b is incident on the objective lens 16 at the incident angle of 0 degree. FIG. 19A shows spherical aberration SA and offense SC against sine condition at the wavelength of 790 nm; FIG. 19B shows chromatic aberration represented by spherical aberration for wavelengths of 790 nm, 785 nm and 795 nm; and FIG. 19C shows astigmatism (DS: sagittal; and DM: meridional).

Figure 20A:
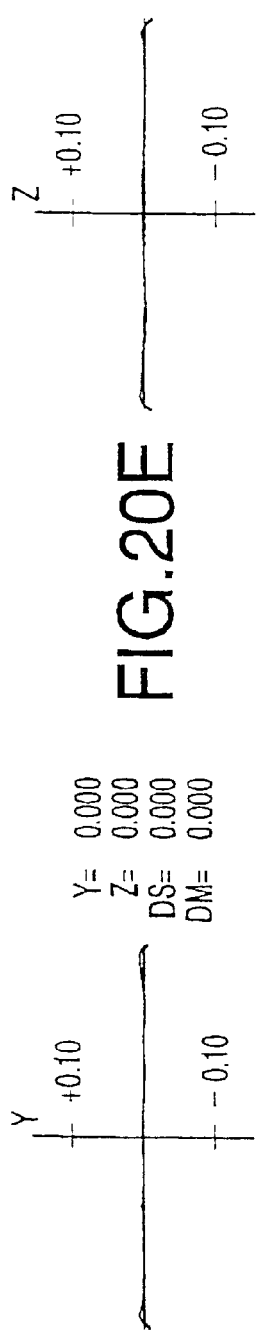
Figure 20B:
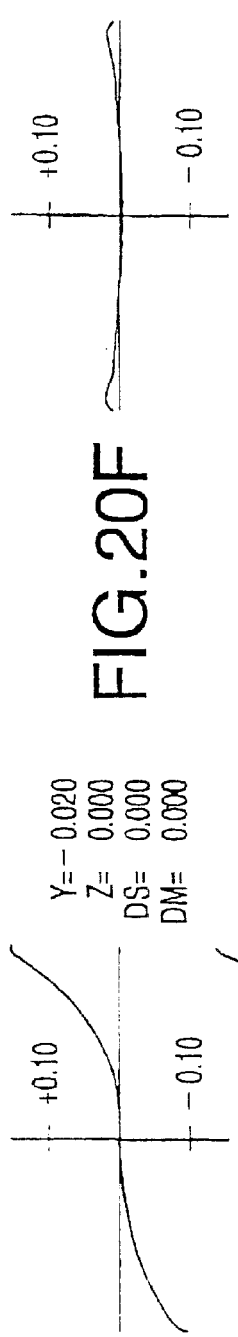
Figure 20C:
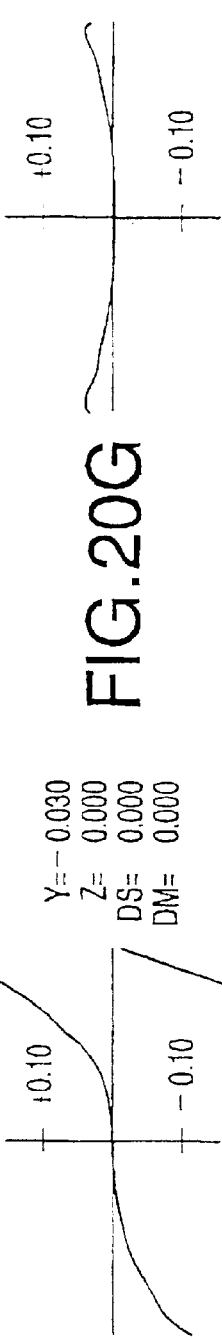
Figure 20D:
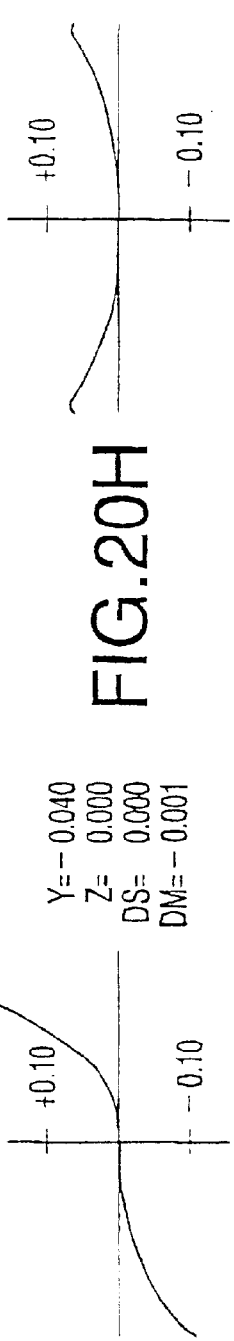
Figure 20E:
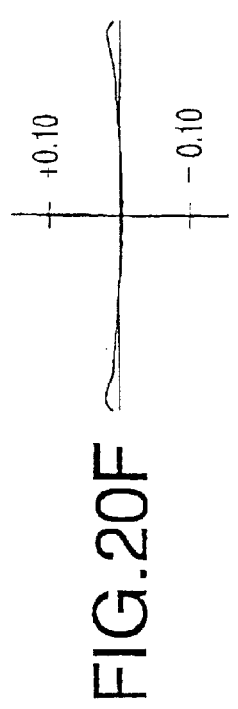
Figure 20F:
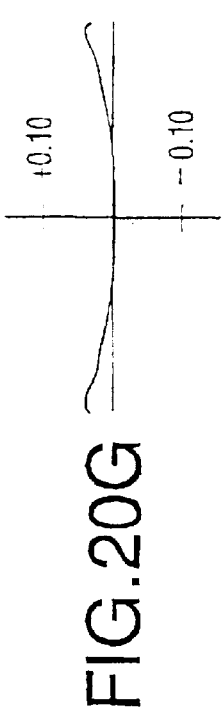
Figure 20G:
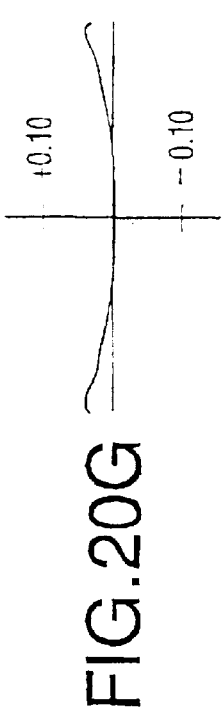
Figure 20H:
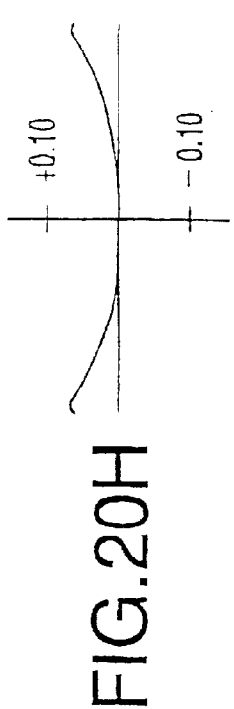

FIGS. 20A–20H show wavefront aberration, under the hypothetical condition shown in FIG. 18, when the beam emitted by the second laser diode 14b is incident on the objective lens 16 at a predetermined incident angle (FIGS. 20A–20D: meridional direction; and FIGS. 20E–20H: sagittal direction). FIGS. 20A and 20E are graphs when the incident angle is 0°, FIGS. 20B and 20F are graphs when the incident angle is 0.5°, FIGS. 20C and 20G are graphs when the incident angle is 0.75° and FIGS. 20D and 20H are graphs when the incident angle is 1.0°.

Since the objective lens 16 exhibits the negative coma when the CD is used, as shown in FIGS. 20B–20D, and 21, the absolute value of the wavefront aberration increases as the incident angle increases.

FIG. 21 is a graph showing a relationship between the incident angle of the beam emitted from the second laser diode 14b with respect to the objective lens 16 and wavefront aberration (rms: root-mean-square value).

It is understood by comparing FIGS. 19A, 20B–20D with FIGS. 15A and 16B–16D, respectively, for the same incident angle, the aberrations are caused in opposite directions.

In the above embodiment, the offense $SC_1$ against sine condition at the peripheral portion of the common region Rc when the shorter wavelength (659 nm) laser beam is converged on the data recording surface of the DVD 91 is 0.0155 mm, the offense $SC_2$ against sine condition at the peripheral portion of the common region RC when the longer wavelength (790 nm) laser beam is converged on the data recording surface of the CD 92 is −0.0197 mm. Therefore, SC2/SC1=0.0155/(−0.0197)=−0.787, which satisfies the condition (1).

With the above-described objective lens 16 and with exemplary arrangements described below, the coma when the DVD is used and the laser beam 13a emitted by the first laser diode 14a is incident on the objective lens 16 with an angle of approximately 0.5 degrees formed with respect to the reference axis 10X is minimized.

When the normal to the optical disc 2 is inclined with respect to the reference axis 10X, and the optical axis 16X of the objective lens 16X coincides with the reference axis 10X, as in the first and third embodiments, the normal to the optical disc is inclined with respect to the reference axis by 0.24 degrees such that the incident angle with respect to the optical disc of the laser beam emitted by the first laser diode is greater than the incident angle with respect to the optical disc of the laser beam emitted by the second laser diode. With this arrangement, in each case where the DVD and CD are used, the coma caused by the laser beam impinging on the objective lens at a certain incident angle can be cancelled by the coma caused by the optical disc being inclined.

FIG. 22 shows a relationship between the wavefront aberration (rms representation) and the angle formed between the laser beam 13a incident on the objective lens and the reference axis when the DVD is used, and the normal to the optical axis is inclined at 0.24 degrees with respect to the reference axis. As understood from FIG. 22, the wavefront aberration is the lowest at the angle of 0.5 degrees, and the wavefront aberration is $0.020\lambda$ or lower, which is an allowable level, within a range of −0.3 to 0.3 degrees with respect 0.5 degrees.

FIG. 23 shows a relationship between the wavefront aberration (rms representation) and the angle formed between the laser beam 13b incident on the objective lens and the reference axis when the CD is used, and the normal to the optical axis is inclined at 0.24 degrees with respect to the reference axis. As understood from FIG. 23, the wavefront aberration is the lowest at the angle of −0.74 degrees, and the wavefront aberration is $0.020\lambda$ or lower, which is an allowable level, within a range of −0.35 to 0.35 degrees with respect to −0.74 degrees.

When the optical axis of the objective lens is inclined with respect to the reference axis, and the normal to the optical disc coincides with the reference axis, as in the second embodiment, the optical axis is inclined with respect to the reference axis by −0.15 degrees such that the incident angle of the laser beam emitted by the first laser diode with respect to the objective lens is smaller than the incident angle of the laser beam emitted by the second laser diode with respect to the objective lens. With this configuration, in each case where the DVD and CD are used, the coma caused by the laser beam impinging on the objective lens at a certain incident angle can be cancelled by the coma caused by the objective lens being inclined with respect to the reference axis.

FIG. 24 shows a relationship between the wavefront aberration (rms representation) and the angle formed between the laser beam 13a incident on the objective lens and the reference axis when the DVD is used, and the optical axis of the objective lens is inclined at −0.15 degrees with respect to the reference axis. As understood from FIG. 24, the wavefront aberration is the lowest at the angle of 0.5 degrees, and the wavefront aberration is $0.020\lambda$ or lower, which is an allowable level, within a range of approximately −0.5 to 0.4 degrees with respect to 0.5 degrees.

FIG. 25 shows a relationship between the wavefront aberration (rms representation) and the angle formed between the laser beam 13b incident on the objective lens and the reference axis when the CD is used, and the optical axis of the objective lens is inclined at −0.15 degrees with respect to the reference axis. As understood from FIG. 25, the wavefront aberration is the lowest at the angle of −0.4 degrees, and the wavefront aberration is $0.020\lambda$ or lower, which is an allowable level, within a range of approximately −0.5 to 0.5 degrees with respect to −0.4 degrees.

As described above, according to the embodiments, the coma caused by the laser beams being incident on the objective lens at an angle with respect to the reference axis can be cancelled by inclining the optical axis of the objective lens relative to the normal to the optical disc. Therefore, when a laser module including two laser diodes incorporated in a single package is used, aberrations can be well suppressed and appropriate beam spots can be formed on any one of various types of optical discs.

The present disclosure relates to the subject matter contained in Japanese Patent Application No. 2000-112114, filed on Apr. 13, 2000, which is expressly incorporated herein by reference in its entirety.

What is claimed is:

1. An optical disc drive capable of recording/reproducing data to/from an optical disc, said optical disc being either one of a first disc and a second disc, a protective layer of said first disc being thinner that that of said second disc, comprising:

a first laser diode that emits a first laser beam having a first wavelength;

a second laser diode that emits a second laser beam having a second wavelength, said second wavelength being longer than said first wavelength;

an objective lens that converges the first laser beam on said first disc, and the second laser beam on said second disc; and a driving unit that holds and rotates said optical disc, an optical axis of said objective lens being inclined relative to a normal to said optical disc, a beam emitting point of said first laser diode being located at a first position, coma, which is caused when the first laser beam is converged on a data recording surface of said first disc, being minimized when said first laser beam is emitted from said first position, and a beam emitting point of said second laser diode being located at a second position which is different from said first position, wherein coma, which is caused when the second laser beam is converged on a data recording surface of said second disc, is minimized when said second laser beam is emitted from said second position.

2. The optical disc drive according to claim 1, wherein said objective lens is configured such that coma is minimized for a hypothetical disc under a hypothetical condition, the hypothetical disc being an optical disc having a protective layer whose thickness is intermediate between that of said first disc and that of said second disc, said hypothetical condition being a condition where the optical axis of said objective lens coincides with the normal to said optical disc.

3. The optical disc drive according to claim 2, wherein a first region is defined on said objective lens, said first region providing a numerical aperture appropriate for converging said second laser beam on said second disc, wherein said objective lens is configured to satisfy the following condition under a hypothetical condition where the optical axis of said objective lens coincides with the normal to said optical disc:

$$-4.0 < SC_1/SC_2 < -0.25,$$

wherein, $SC_1$ represents an offense SC against sine condition at the peripheral portion of said first region when the said first laser beam is converged on said first disc, wherein $SC_2$ represents an offense SC against sine condition at the peripheral portion of said first region when said second laser beam is converged on the second disc, the offense SC against the sine condition being defined by the formula below:

$$SC = nH_1/(n' \sin U') - f(1-m)$$

wherein, n represents a refractive index of the beam incident side medium, n' represents a refractive index of the beam emerging side medium, U' represents an angle of the emerging beam with respect to the optical axis, m represents a paraxial magnification, $H_1$ represents a ray height on a principal plane, and f represents a focal length.

4. The optical disc drive according to claim 1, said optical axis of said objective lens and said normal to said optical disc being included in a reference plane, said first position and said second position being located on opposite sides with respect to a reference axis, wherein said reference axis is an optical axis of said objective lens under a hypothetical condition where said optical axis of said objective lens and said normal to said optical disc coincide with each other, and wherein said reference plane is a plane including said reference axis and said first and second positions.

5. The optical disc drive according to claim 4, wherein said first position and said second position are arranged such that, by arranging the optical axis of said objective lens to be inclined with respect to the normal to said optical disc, said first laser beam is converged on a side where a distance between said objective lens and said optical disc increases, and said second laser beam is converged on a side where a distance between said objective lens and said optical disc decreases.

6. The optical disc drive according to claim 5, wherein said objective lens is configured such that coma is minimized for a hypothetical disc under a hypothetical condition, the hypothetical disc being an optical disc having a protective layer whose thickness is intermediate between that of said first disc and that of said second disc, said hypothetical condition being a condition where the optical axis of said objective lens coincides with the normal to said optical disc.

7. The optical disc drive according to claim 6, wherein a first region is defined on said objective lens, said first region providing a numerical aperture appropriate for converging said second laser beam on said second disc, wherein said objective lens satisfies the following condition under the hypothetical condition where the optical axis of said objective lens coincides with the normal to said optical disc:

$$-4.0 < SC_1/SC_2 < -0.25,$$

wherein, $SC_1$ represents an offense SC against sine condition at the peripheral portion of said first region when the said first laser beam is converged on said first disc, wherein $SC_2$ represents an offense SC against sine condition at the peripheral portion of said first region when said second laser beam is converged on the second disc, the offense SC against the sine condition being defined by the formula below:

$$SC = nH_1/(n' \sin U') - f(1-m)$$

wherein, n represents a refractive index on the beam incident side medium, n' represents a refractive index on the beam emerging side medium, U' represents an angle of the emerging beam with respect to the optical axis, m represents a paraxial magnification, $H_1$ represents a ray height on a principal plane, and f represents a focal length.

8. The optical disc drive according to claim 5, further comprising a fine movement mechanism for driving said objective lens to move for focusing and tracking, said reference axis being inclined with respect to the normal to said optical disc, said objective lens being held by said fine movement mechanism such that said optical axis coincides with said reference axis.

9. The optical disc drive according to claim 8, wherein said driving unit holds said optical disc such that the data recording surface of said optical disc extends in parallel with a bottom surface of a case of said optical disc drive.

10. The optical disc drive according to claim 9, further comprising a mirror member that reflects the laser beam emitted by each of said first laser diode and said second laser diode to impinge on said objective lens, said mirror member bends said reference axis parallel to the data recording surface of said optical disc in the optical disc side.

11. The optical disc drive according to claim 10, further comprising a rough movement mechanism that drives said objective lens in a direction parallel to the data recording surface of said optical disc for seek.

12. The optical disc drive according to claim 8, wherein said driving unit holds said optical disc by inclining the data recording surface with respect to a bottom surface of a case of said optical disc drive so that said reference axis is perpendicular to a bottom surface of a case of said optical disc drive.

13. The optical disc drive according to claim 12, further comprising a mirror member that reflects the laser beam emitted by each of said first laser diode and said second laser diode to impinge on said objective lens, said mirror member bends said reference axis parallel to the data recording surface of said optical disc in the optical disc side.

14. The optical disc drive according to claim 13, further comprising a rough movement mechanism that drives said objective lens in a direction parallel to the data recording surface of said optical disc for seek.

15. The optical disc drive according to claim 5, further comprising a fine movement mechanism for driving said objective lens to move for focusing and tracking, said reference axis coinciding with the normal to said optical disc, said objective lens being held by said fine movement mechanism such that said optical axis is inclined with respect to said reference axis.

16. The optical disc drive according to claim 15, further comprising a mirror member that reflects the laser beam emitted by each of said first laser diode and said second laser diode to impinge on said objective lens, said mirror member bends said reference axis parallel to the data recording surface of said optical disc in the optical disc side.

17. The optical disc drive according to claim 16, further comprising a rough movement mechanism that drives said objective lens in a direction parallel to the data recording surface of said optical disc for seek.

18. The optical disc drive according to claim 15, wherein said driving unit holds said optical disc such that the data recording surface of said optical disc extends in parallel with a bottom surface of a case of said optical disc drive.

19. The optical disc drive according to claim 18, further comprising a mirror member that reflects the laser beam emitted by each of said first laser diode and said second laser diode to impinge on said objective lens, said mirror member bends said reference axis parallel to the data recording surface of said optical disc in the optical disc side.

20. The optical disc drive according to claim 15, further comprising a rough movement mechanism that drives said objective lens in a direction parallel to the data recording surface of said optical disc for seek.

* * * * *